US012616554B2

(12) United States Patent
Coreil et al.

(10) Patent No.: US 12,616,554 B2
(45) Date of Patent: May 5, 2026

(54) CUSTOMIZED TEMPORARY VENEERS AND METHODS OF PROVIDING THE SAME

(71) Applicant: Trion Concepts, Inc., Shreveport, LA (US)

(72) Inventors: Mark Coreil, Lafayette, LA (US); Christopher C. Cosse, Shreveport, LA (US)

(73) Assignee: Trion Concepts, Inc., Shreveport, LA (US)

( * ) Notice: Subject to any disclaimer, the term of this patent is extended or adjusted under 35 U.S.C. 154(b) by 491 days.

(21) Appl. No.: 17/550,923

(22) Filed: Dec. 14, 2021

(65) Prior Publication Data

US 2023/0181284 A1      Jun. 15, 2023

(51) Int. Cl.
*A61C 5/20* (2017.01)
*A61C 13/00* (2006.01)

(52) U.S. Cl.
CPC ............ *A61C 5/20* (2017.02); *A61C 13/0004* (2013.01); *A61C 2201/002* (2013.01)

(58) Field of Classification Search
CPC .. A61C 5/20; A61C 5/30; A61C 5/007; A61C 13/0004; A61C 13/0001; A61C 13/34
See application file for complete search history.

(56) References Cited

U.S. PATENT DOCUMENTS 1,586,912 A     6/1926   Murphy
3,644,996 A     2/1972   Weinkle
(Continued)

FOREIGN PATENT DOCUMENTS

WO      WO 2008/042936 A2     4/2008
WO      WO 2017/186835 A1     11/2017

OTHER PUBLICATIONS

Black Bear Concrete, Top 5 Reasons to Consider Urethane Flooring for Warehouse, Food Facilities, or Research Labs, 2016 (Year: 2016).*

(Continued)

*Primary Examiner* — Eric J Rosen
*Assistant Examiner* — Sydney J Pulvidente
(74) *Attorney, Agent, or Firm* — Kolitch Romano Dascenzo Gates LLP

(57) ABSTRACT

Customized temporary veneers that are configured to be temporarily installed in a customer's mouth and provide a desired oral appearance thereto. The customized temporary veneers include a veneer body configured to extend across at least a portion of a target region of the customer's mouth and including oral-facing and outward-facing surfaces. The oral-facing surface is configured support the customized temporary veneer relative to the target region by engagement with one or more vestibular surfaces within the target region. A plurality of oral features define at least a portion of the outward-facing surface and are configured to present the desired oral appearance. The methods may include obtaining a representation of the target region, selecting the plurality of oral features, and creating the customized temporary veneer, which includes forming the veneer body, shaping the oral-facing surface based on the representation, and providing the plurality of oral features to the outward-facing surface.

23 Claims, 7 Drawing Sheets

(56)                 References Cited

U.S. PATENT DOCUMENTS

|  |  |  |  |  |
|---|---|---|---|---|
| 3,760,502 | A * | 9/1973 | Hirsch | A61C 5/70 |
|  |  |  |  | 433/222.1 |
| 4,204,324 | A | 5/1980 | Köstner et al. |  |
| 4,992,049 | A * | 2/1991 | Weissman | A61C 5/00 |
|  |  |  |  | 433/218 |
| 5,186,626 | A * | 2/1993 | Tanaka | A61K 6/802 |
|  |  |  |  | 433/180 |
| 5,324,198 | A | 6/1994 | Hazen |  |
| 5,575,649 | A * | 11/1996 | Lee | A61C 3/00 |
|  |  |  |  | 433/141 |
| 6,994,545 | B2 | 2/2006 | Mrotzek et al. |  |
| 7,442,040 | B2 | 10/2008 | Kuo |  |
| 8,377,500 | B2 | 2/2013 | Yarovesky |  |
| 9,610,145 | B2 | 4/2017 | Howe |  |
| 10,265,141 | B2 | 4/2019 | Mason et al. |  |
| 11,311,359 | B1 * | 4/2022 | Alhumayyani | A61C 5/20 |
| 11,833,008 | B1 * | 12/2023 | Motlagh | A61F 5/566 |
| 2004/0081938 | A1 | 4/2004 | Chishti et al. |  |
| 2004/0248065 | A1 | 12/2004 | Schneider |  |
| 2005/0227204 | A1 | 10/2005 | Hauck |  |
| 2007/0117067 | A1 | 5/2007 | Rock et al. |  |
| 2008/0014559 | A1 * | 1/2008 | Love | A61C 5/20 |
|  |  |  |  | 433/29 |
| 2008/0176189 | A1 | 7/2008 | Stonisch |  |
| 2008/0299510 | A1 | 12/2008 | Penchas et al. |  |
| 2009/0075235 | A1 | 3/2009 | Letcher |  |
| 2009/0142734 | A1 | 6/2009 | Albert |  |
| 2009/0208897 | A1 | 8/2009 | Kuo |  |
| 2009/0286206 | A1 * | 11/2009 | Braich | A61C 5/20 |
|  |  |  |  | 433/201.1 |
| 2010/0297585 | A1 | 11/2010 | Yarovesky |  |
| 2011/0033815 | A1 * | 2/2011 | Stonisch | A61C 13/0001 |
|  |  |  |  | 433/24 |
| 2011/0081630 | A1 | 4/2011 | Beveridge |  |
| 2012/0183924 | A1 * | 7/2012 | Lin | A61C 5/73 |
|  |  |  |  | 433/178 |
| 2014/0113251 | A1 * | 4/2014 | Schweiger | A61C 13/082 |
|  |  |  |  | 433/199.1 |
| 2017/0014206 | A1 | 1/2017 | Lampl |  |
| 2017/0196657 | A1 * | 7/2017 | Nixon | A61C 13/206 |
| 2018/0042705 | A1 * | 2/2018 | Howe | A61C 13/1003 |
| 2020/0000552 | A1 * | 1/2020 | Mednikov | G16H 50/50 |
| 2020/0222158 | A1 * | 7/2020 | Coreil | A61C 13/235 |
| 2021/0322134 | A1 * | 10/2021 | Hamed | A61K 6/20 |
| 2022/0249210 | A1 * | 8/2022 | Alhumayyani | A61C 13/0006 |

OTHER PUBLICATIONS

English-language machine translation of PCT Patent Application Publication No. WO 2017/186835 A1, Google Patents, Nov. 2, 2017.

Javaid, Mohd et al., Current Status and Applications of Additive Manufacturing in Dentistry: A Literature-based Review, Journal of Oral Biology and Craniofacial Research, 9 (2019), pp. 179-185.

Nelson, Craig, Customized Characterization Made Easy, Inside Dental Technology, Jul. 2014, vol. 5, Issue 7, available from: https://www.aegisdentalnetwork.com/idt/2014/07/Customized-Characterization-Made-Easy.

Polar Seal, User Friendly Incision Films, accessed on Aug. 18, 2021 from: https://www.polarseal.net/applications/surgical-films/ on Aug. 18, 2021.

Wunderer, Julia et al., A Mechanism for Temporary Bioadhesion, PNAS, Mar. 5, 2019, vol. 116, No. 10, pp. 4297-4306.

* cited by examiner

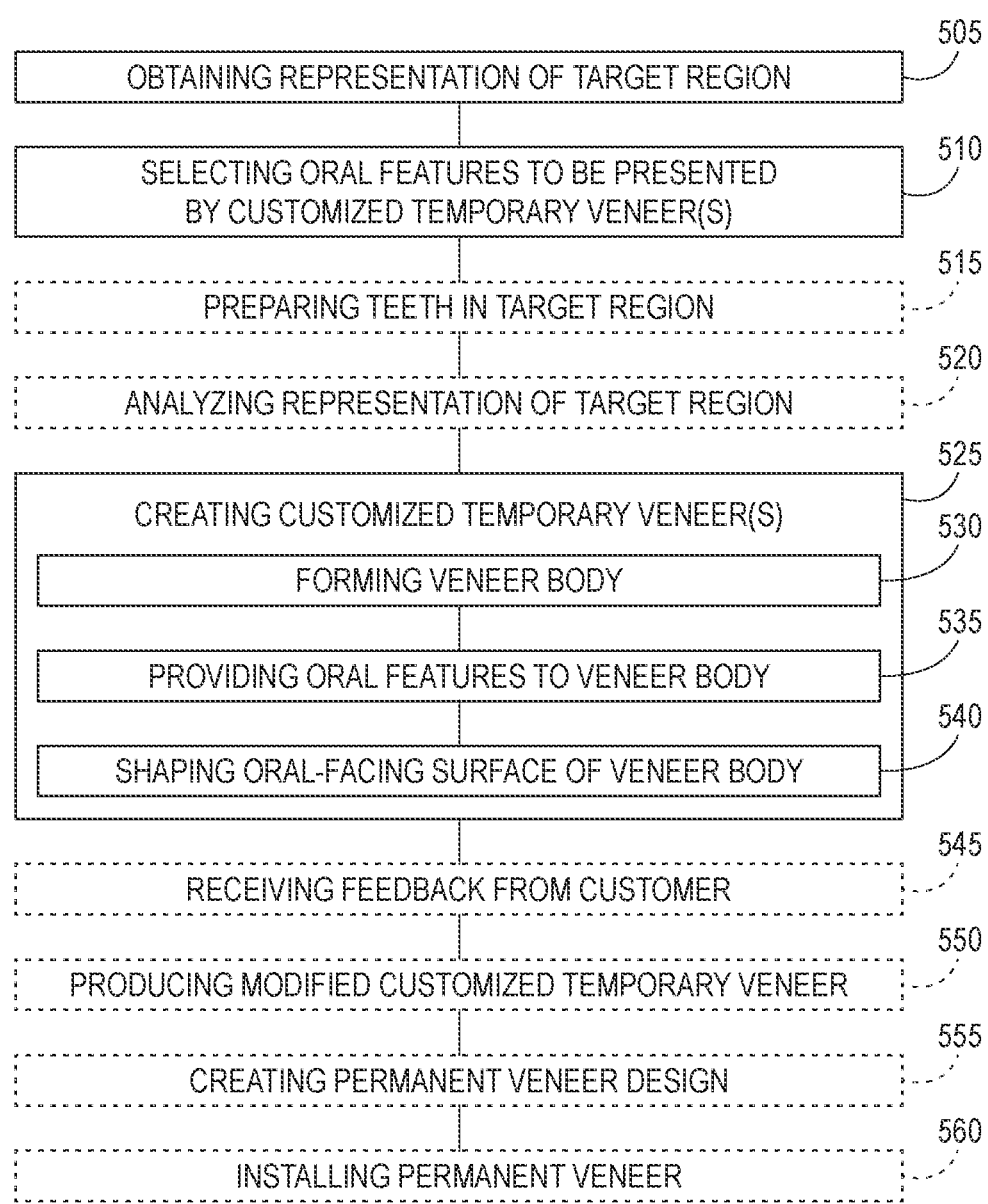

500

505 OBTAINING REPRESENTATION OF TARGET REGION

510 SELECTING ORAL FEATURES TO BE PRESENTED BY CUSTOMIZED TEMPORARY VENEER(S)

515 PREPARING TEETH IN TARGET REGION

520 ANALYZING REPRESENTATION OF TARGET REGION

525 CREATING CUSTOMIZED TEMPORARY VENEER(S)

530 FORMING VENEER BODY

535 PROVIDING ORAL FEATURES TO VENEER BODY

540 SHAPING ORAL-FACING SURFACE OF VENEER BODY

545 RECEIVING FEEDBACK FROM CUSTOMER

550 PRODUCING MODIFIED CUSTOMIZED TEMPORARY VENEER

555 CREATING PERMANENT VENEER DESIGN

560 INSTALLING PERMANENT VENEER

FIG. 8

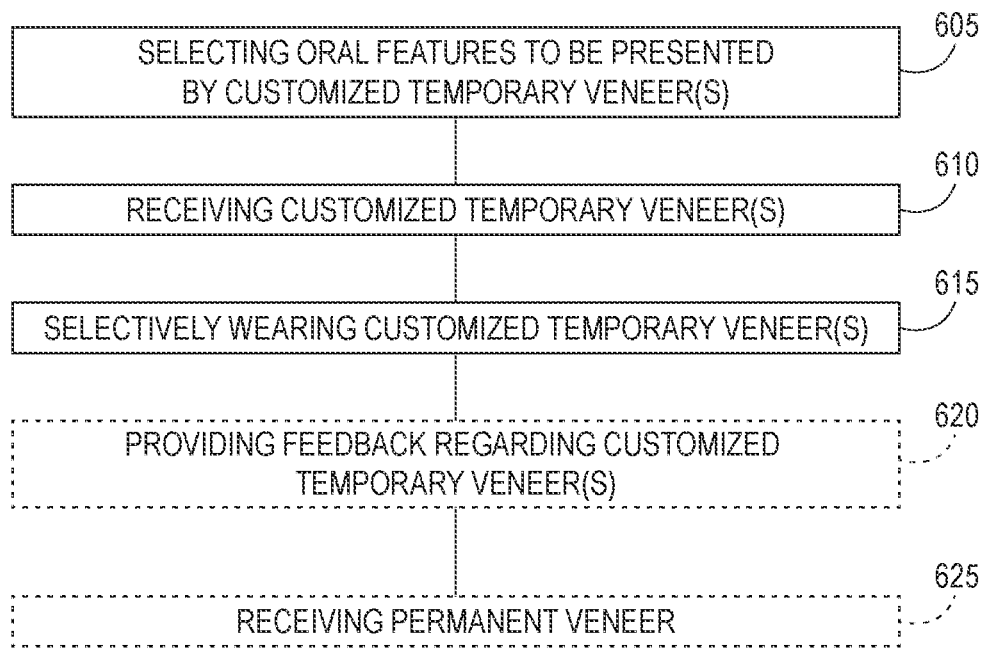
FIG. 9

CUSTOMIZED TEMPORARY VENEERS AND METHODS OF PROVIDING THE SAME

FIELD

The present disclosure relates to customized temporary veneers and methods of providing the same.

BACKGROUND

A study commissioned by the American Association of Orthodontists found that over one third of American adults are unhappy with the appearance of their teeth, and of this group, thirty-six percent believe they would have a better social life if they had better teeth. Dental veneers are one approach to improving the appearance of an individual's teeth. Generally speaking, dental veneers are tooth-like shells that are attached to the front surface of an individual's existing teeth. Each dental veneer may cover and obscure an existing tooth and is designed to replace the appearance of the existing tooth with an ideal tooth appearance. Dental veneers typically are bonded to the individual's existing teeth using permanent adhesives, and a customer's existing teeth often must be "prepped" before the dental veneers are attached. This prepping can involve permanent modifications to the existing teeth, such as grinding down or adding grooves to the existing tooth structures to alter the existing teeth to facilitate a strong and secure bond with the veneers.

Currently, an individual seeking dental veneers is provided with a digital or a "wax up" model of their veneer-modified teeth, which they are not able to physically wear in their mouth. In this way, the current dental veneer installation process requires individuals to make permanent decisions about their teeth with limited knowledge about the outcome. Thus, a need exists for improved customized temporary veneers and/or methods of providing customized temporary veneers, with such veneers and methods allowing an individual to improve their oral appearance without making permanent decisions and/or to try out veneer appearances before making permanent decisions.

SUMMARY

Customized temporary veneers and methods of providing customized temporary veneers are disclosed herein. The customized temporary veneers are configured to be temporarily installed in a customer's mouth and provide a desired oral appearance to the customer's mouth. The customized temporary veneers include a veneer body configured to extend across at least a portion of a target region of the customer's mouth. The veneer body includes an oral-facing surface and an outward-facing surface opposed to the oral-facing surface. The oral-facing surface is configured to engage one or more vestibular surfaces within the target region and to selectively support the customized temporary veneers relative to the target region by engagement with the one or more vestibular surfaces. The customized temporary veneers further include a plurality of oral features defining at least a portion of the outward-facing surface of the veneer body and collectively configured to present the desired oral appearance in a vestibular direction of the target region when the customized temporary veneer is installed in the customer's mouth.

The methods include obtaining a representation of the target region, selecting the plurality of oral features to be presented by the customized temporary veneer, and creating the customized temporary veneer. Creating the customized temporary veneer may include forming the veneer body, shaping the oral-facing surface of the veneer body based on the representation of the target region, and providing the plurality of oral features to the outward-facing surface of the veneer body. The methods may include forming a plurality of customized temporary veneers. In such methods, the selecting may include selecting a respective plurality of oral features to be presented by each customized temporary veneer, the creating may include creating the plurality of customized temporary veneers, and the providing may include providing the respective plurality of oral features to each customized temporary veneer.

BRIEF DESCRIPTION OF THE DRAWINGS

FIG. 8 is a flowchart schematically representing examples of methods of providing customized temporary veneer(s), according to the present disclosure.

FIG. 9 is a flowchart schematically representing examples of methods of utilizing customized temporary veneer(s), according to the present disclosure.

DETAILED DESCRIPTION

Figure 1:
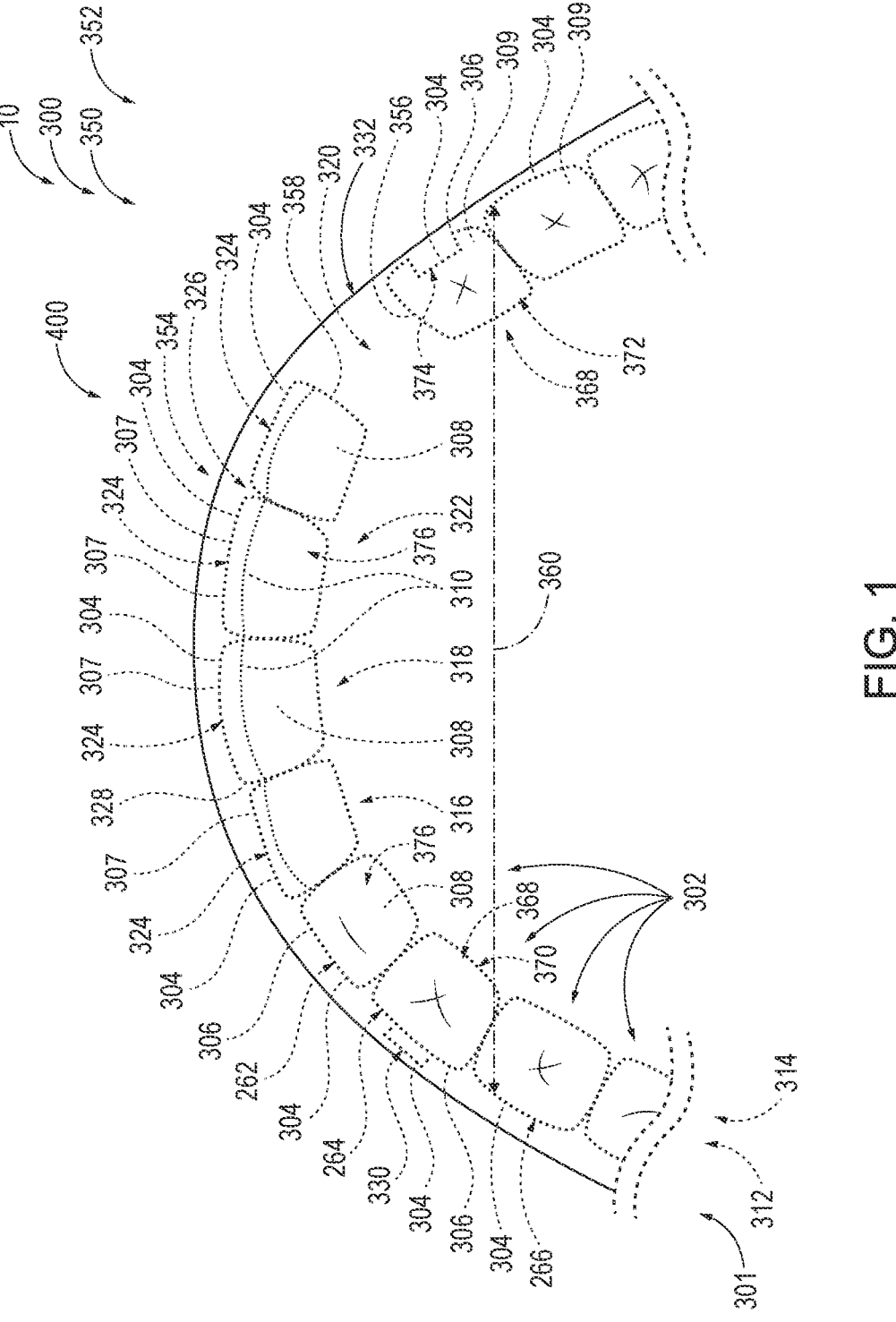
FIG. 1 is a schematic representation of examples of a target region of a customer's mouth.

FIGS. 1-9 provide examples of customized temporary veneers 100, target regions 400 of a customer's mouth 300 along which customized temporary veneers 100 may be installed, methods 500 of providing customized temporary veneer(s) 100, and methods 600 of utilizing customized temporary veneer(s), according to the present disclosure. Elements that serve a similar, or at least substantially similar, purpose are labelled with like numbers in each of FIGS. 1-9, and these elements may not be discussed in detail herein with reference to each of FIGS. 1-9, but reference numbers associated therewith may be utilized herein for consistency. Elements, components, and/or features that are discussed herein with reference to one or more of FIGS. 1-9 may be included in and/or utilized with any other of FIGS. 1-9, without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure. Dot-dash lines may be utilized herein to indicate various virtual features (e.g., dimensions defined by various structures), and these virtual features may or may not be optional to the illustrated embodiment. Also in the figures, dotted lines are utilized to indicate features and/or structure that may be environment to customized temporary veneers 100, for example, portions of a customer's mouth 300.

FIG. 1 is a schematic plan view illustrating a portion of customer's mouth 300. As shown, customer's mouth 300 includes a target region 400, and customized temporary veneers 100 according to the present disclosure are configured to be installed within target region 400 as discussed in more detail herein. Examples of customized temporary veneers 100 are illustrated in FIGS. 2-7 and discussed in more detail herein with reference thereto.

Customer's mouth 300 includes a dental arch 301 comprising a plurality of teeth 302. Teeth 302 additionally or alternatively may be referred to as existing teeth 302 and/or natural teeth 302. As discussed herein, dental arch 301 may be described as an arrangement of teeth 301 disposed along a mandible 350 or a maxilla 352 of customer's mouth 300. When dental arch 301 is included in mandible 350, dental arch 301 may be referred to as a mandibular dental arch 314. When dental arch 301 is included in maxilla 352, dental arch 301 may be referred to as maxillary dental arch 312. In other words, teeth 302 may be maxillary teeth or mandibular teeth.

Target region 400 may include a region of customer's mouth 300 that the customer 10 may want to obscure, and/or improve the outward appearance of, utilizing customized temporary veneer 100. Target region 400 also may include a region of customer's mouth 300 that the customer is interested in modifying with a permanent veneer, such as discussed herein. Target region 400 typically includes a plurality of teeth 302 that form a section of maxillary dental arch 312 or mandibular dental arch 314. Individual teeth 302 included in target region 400 and/or the collective teeth 302 within target region 400 may have a natural outward appearance that a customer 10 is interested in improving and/or that the customer 10 would like to replace with a desired outward appearance. As examples, target region 400 may include one or more misaligned teeth 316, and/or one or more damaged teeth 318. Additionally or alternatively, target region 400 may include one or more gaps 320, which may correspond to one or more missing teeth. In other words, teeth 302 within target region 400 may be spaced apart by gaps 320. Target region 400 also may include one or more surgical sites 322 that may be prepped for and/or healing from an oral surgery and that also may include one or more gaps or empty spaces. Target region 400 further may include one or more teeth 302 that are proximal to the teeth 302 that customer 10 would like to obscure and that customized temporary veneer 100 may selectively engage to selectively retain customized temporary veneer 100 within customer's mouth 300.

The arrangement of teeth 302 of dental arch 301 within target region 400 may include any or all teeth disposed along the mandible or maxilla of customer's mouth 300. As examples, the arrangement of teeth may include incisor teeth 224, canine teeth 262, premolar teeth 264, and/or molar teeth 266. In some examples, teeth 302 within target region 400 includes one or more non-natural fixtures, such as dental prostheses and/or dental implants, that may be installed in the customer's mouth in place of the customer's natural teeth. At least some teeth 302, or gaps 320 corresponding to missing teeth, within target region 400 are visible from outside of customer's mouth 300, such as when customer 10 opens their mouth, smiles, talks, and/or otherwise moves their lips to expose teeth 302. With this in mind, target region 400 may include at least two, at least three, at least four, and/or all anterior teeth within dental arch 301. As referred to herein, anterior teeth include incisor teeth 324 and canine teeth 262. Target region 400 also may include at least some posterior teeth, which include premolar teeth 264 and molar teeth 266, such as those that are adjacent to the anterior teeth.

Customer's mouth 300 also includes a corresponding natural gum 332 from which each dental arch 301 protrudes. In other words, maxilla 352 includes a maxillary gum, from which maxillary dental arch 312 protrudes, and mandible 350 includes a mandibular gum from which mandibular dental arch 314 protrudes. In some examples, target region 400 includes at least a portion of natural gum 332, which may be the portion of natural gum 332 that is adjacent to teeth 302 within target region 400.

Each tooth 302 comprises a plurality of surfaces, edges, and/or curves that define the shape of the tooth 302. As discussed in more detail herein, customized temporary veneers 100 may be configured to selectively engage one or more surfaces, edges, and/or curves of teeth 302 within the target region 400 to selectively retain customized temporary veneer 100 within the customer's mouth 300. For example, each tooth 302 may comprise a buccal surface 306 or a labial surface 307 that face a vestibule 354 of the customer's mouth 300, and a lingual surface 308 that faces away from vestibule 354. Each tooth 302 also may include a mesial surface 356 and a distal surface 358, and portions of the mesial surface 356 and distal surface 358 face vestibule 354. Thus, each tooth 302 may be described as defining a vestibular surface 304 that faces vestibule 354, that comprises labial surface 307, buccal surface 306, and/or portions of mesial surface 356 and distal surface 358, and that does not comprise lingual surface 308. Incisors 324 may include incisal edges 310 that form the portion of incisor 324 farthest from natural gum 332. The posterior teeth may include occlusal surfaces 309 that form the surface of posterior teeth furthest from natural gum 332. Any given tooth 302 also may be tapered towards natural gum 332 to define a dental undercut 328. Similarly, the proximal surfaces of proximal teeth (i.e., teeth 302 that are directly adjacent to one another) may taper towards natural gum 332 and away from one another to form a gingival embrasure 326 therebetween.

Target region 400 also may be described as defining a vestibular profile that includes the vestibular surface of each tooth 302 within target region 400 and any spaces therebetween. The vestibular profile also may include the vestibular surface 304 of natural gum 332 within target region 400. In other words, the vestibular profile of target region 400 may include an arched and contiguous surface that follows to the vestibular surface 304 of each tooth 302, and optionally, natural gum 332 within target region 400. Along any spaces between teeth 302, such as those created by gingival embrasures 326 and/or gaps 320, the vestibular profile may extend between inflection points, or proximal surfaces of the teeth 302 proximate to the space.

Target region 400 optionally may include one or more prepared teeth 368, which additionally or alternatively may be referred to as prepped teeth 368. Prepared teeth 368 may be modified to include a retention structure that customized temporary veneer 100 may be configured to engage. Prepared teeth 368 may be prepared, or partially prepared, for installation of a permanent veneer therealong. As more specific examples, prepared teeth 368 may include one or more additively prepared teeth 370 and/or one or more subtractively prepared teeth 372. Additively prepared teeth 370 may include an additive retention structure 330 that is bonded to, affixed to, or formed on the corresponding tooth 302 and that may protrude from a surface of the corresponding tooth 302, such as a vestibular surface 304 thereof. Additive retention structure 330 may define one or more vestibular surfaces 304 of additively prepared tooth 370. Subtractively prepared teeth 372 may have natural tooth material selectively and artificially removed from the corresponding tooth 302. More specifically, subtractively prepared teeth 372 may include a subtractive retention structure 374 that is recessed or removed relative to a surface of the corresponding tooth 302, such as a vestibular surface 304 thereof. For example, subtractive retention structure 374 may include one or more recessed surfaces that define portions of vestibular surface 304 of the corresponding tooth 302. Subtractively prepared teeth 372 also may be artificially shaped for installation of a permanent veneer. For example, subtractively prepared teeth 372 may be artificially ground down or reduced in height, such as for having a permanent veneer installed therealong. As additional examples, a subtractive retention structure 374 may include one or more grooves formed into vestibular surface 304 or a removed or smoothed region on an occlusal surface 309 of the tooth.

Customer 10 may be an individual that utilizes customized temporary veneers 100, such as according to methods 600 discussed herein with reference to FIG. 9, an individual that is interested in utilizing customized temporary veneers 100, and/or an individual for which customized temporary veneers 100 are provided, such as according to methods 500 discussed herein with reference to FIG. 8. In more general terms, customer 10 may be an individual seeking to improve the outward appearance of their mouth, an individual seeking a permanent veneer, and/or an individual seeking an improved oral appearance and interested in trying on veneer-modified oral appearances such as before making a permanent decision to modify the oral appearance of their existing teeth. As such, customer 10 additionally or alternatively may be referred to as a user, a patient, an individual, and/or a person.

Figure 2:
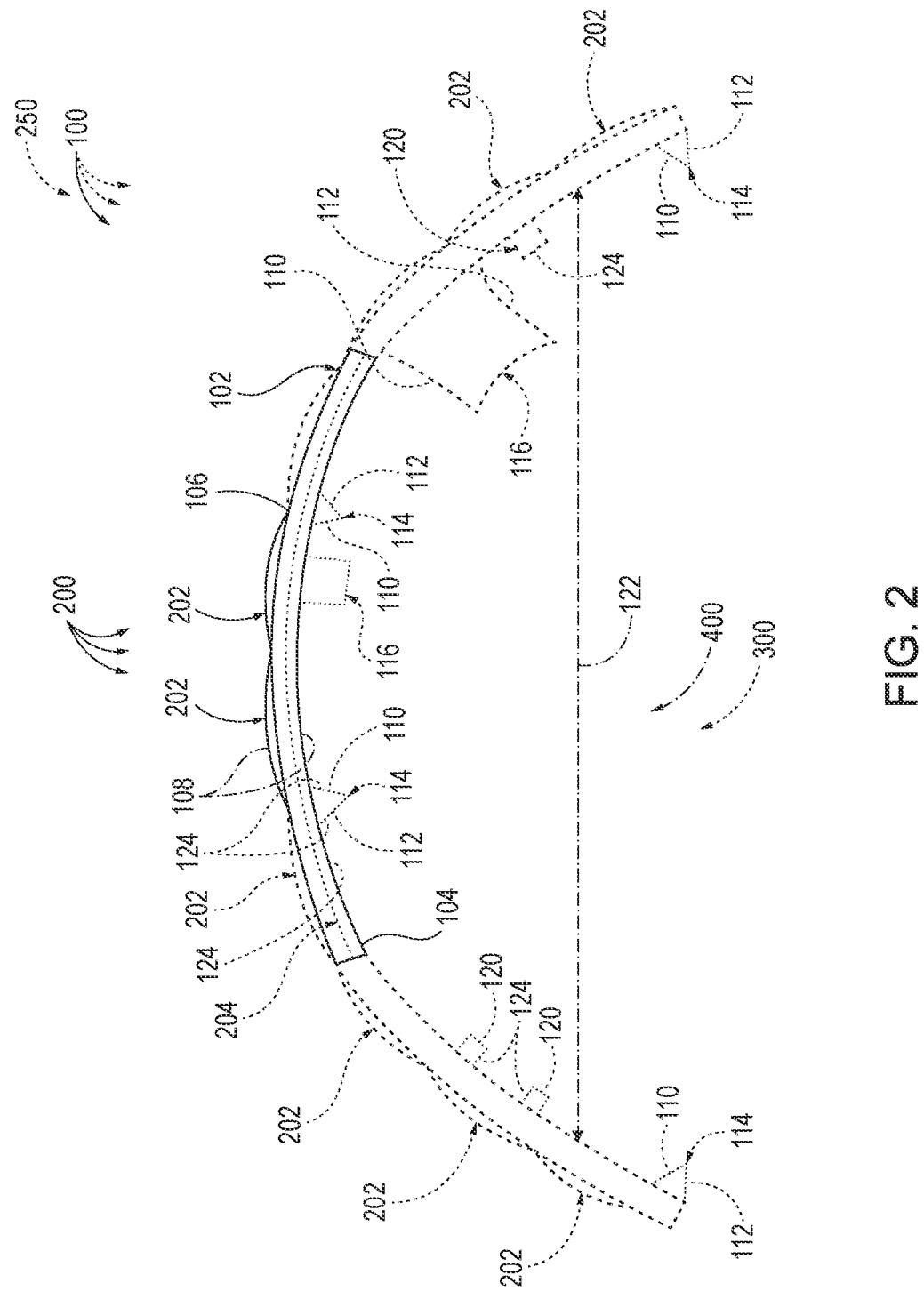
FIG. 2 is a schematic plan view illustrating examples of customized temporary veneers, according to the present disclosure.
Figure 3:
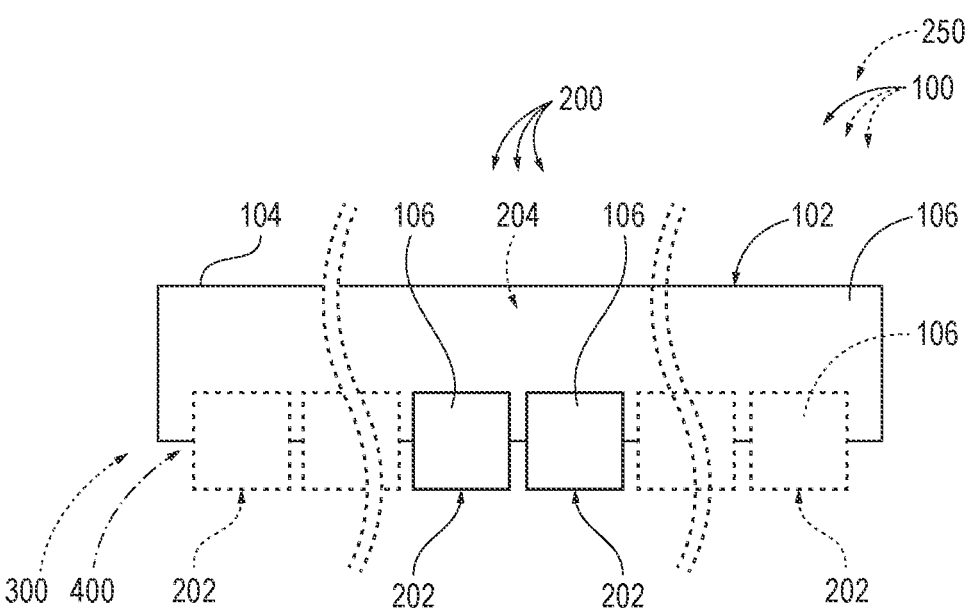
FIG. 3 is a schematic elevation view illustrating examples of customized temporary veneers, according to the present disclosure.
Figure 4:
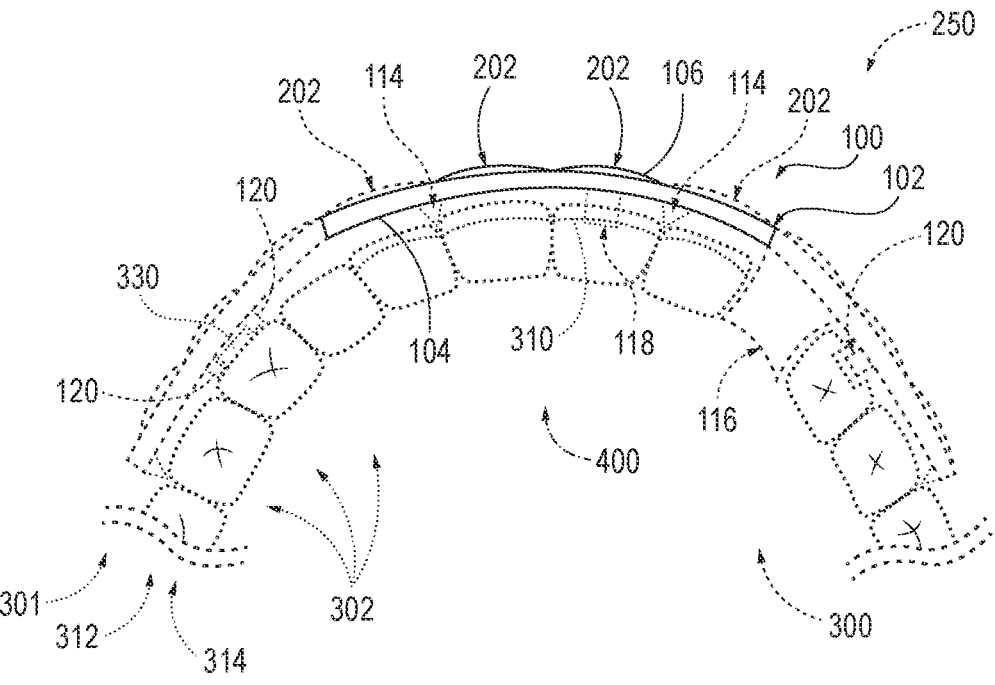
FIG. 4 is a schematic plan view representing examples of customized temporary veneers installed in the example target regions of FIG. 1, according to the present disclosure.

FIG. 2 is a schematic plan view and FIG. 3 is a schematic elevation view illustrating examples of customized temporary veneers 100 according to the present disclosure. FIG. 4 is a schematic plan view illustrating examples of customized temporary veneers 100 installed in target region 400 of the examples of customer's mouth 300 illustrated and discussed herein with reference to FIG. 1. Reference numerals for each of the portions of customer's mouth 300 indicated in FIG. 1 may not be included in FIG. 4 for clarity. However, any portion of customer's mouth 300 discussed herein with reference to FIG. 1 may be included in the examples of FIG. 4 and reference numerals associated therewith may be utilized herein for consistency.

With reference to FIGS. 2-4, customized temporary veneers 100 are configured to be temporarily installed within customer's mouth 300 and present a desired oral appearance to customer's mouth 300. Customized temporary veneers 100 include a veneer body 102 that is configured to extend across at least a portion of, and optionally the entirety of, target region 400. Veneer body 102 includes an oral-facing surface 104 and an outward-facing surface 106 opposed to oral-facing surface 104. Oral-facing surface 104 is configured to selectively engage one or more vestibular surfaces 304 within target region 400 and to selectively support customized temporary veneer 100 relative to target region 400 by engagement with the one or more vestibular surfaces 304. Customized temporary veneer 100 further includes a plurality of oral features 200 defining at least a portion of outward-facing surface 106. Oral features 200 collectively are configured to present the desired oral appearance in a vestibular direction from target region 400 when customized temporary veneer 100 is installed in customer's mouth 300. This desired oral appearance may include an ideal oral appearance, a customer-selected oral appearance, and/or idealized, modified, and/or selected version of the natural appearance of target region 400. As utilized herein, the vestibular direction is a direction extending from dental arch 301 towards vestibule 354 and/or extending opposite to, or away from, a lingual surface of dental arch 301. In other words, the vestibular direction is directed outwardly from both buccal and labial surfaces of the dental arch.

Stated in slightly different terms, oral-facing surface 104 is configured to face teeth 302, and optionally natural gum 332, within target region 400 and selectively engage vestibular surface 304 of one or more teeth 302 within target region 400 to selectively retain customized temporary veneer 100 within customer's mouth 300. As discussed herein, customized temporary veneer 100 may be described as being installed in customer's mouth 300 when oral-facing surface 104 selectively supports customized temporary veneer 100 relative to target region 400 by selective engagement with vestibular surfaces(s) 304. When customized temporary veneer 100 is installed in customer's mouth 300, veneer body 102 is configured to obscure at least a portion of target region 400, such as existing teeth 302 and/or a portion of natural gum 332 therein, and outward-facing surface 106 is configured to present the desired oral appearance in replacement of a natural appearance of target region 400.

Oral-facing surface 104 may selectively support customized temporary veneer 100 in a desired veneer position relative to target region 400. In this desired veneer position, veneer body 102 is positioned to obscure the desired portion of target region 400, and at least a substantial portion of, and optionally the entirety of, customized temporary veneer 100 may be positioned within vestibule 354. Oral-facing surface 104 also may selectively support customized temporary veneer 100 in the desired veneer position against operable forces applied to customized temporary veneer 100 during use. Examples of these operable forces include the weight of customized temporary veneer 100, forces of mastication applied to customized temporary veneer 100 by customer's mouth 300, and/or forces resulting from customer 10 talking, drinking, or otherwise using their mouth.

As referred to herein, customized temporary veneer 100 being configured to be "installed," or "temporarily installed," in customer's mouth 300 refers to customized temporary veneer 100 being configured to be selectively and repeatedly installed in and removed from customer's mouth 300 without damage or destruction to customized temporary veneer 100 and/or the customer's existing teeth 302. Likewise, oral-facing surface 104 being configured to "selectively engage" vestibular surface(s) 304 and "selectively support" customized temporary veneer 100 relative to target region 400 by engagement with vestibular surfaces 304 refers to oral-facing surface 104 being configured to selectively and repeatedly engage and disengage vestibular surfaces 304 without damage or destruction to customized temporary veneer 100 and/or the customer's existing teeth 302. Customized temporary veneer 100 also may be repeatedly installed within and removed from the customer's mouth 300 any suitable number of times through any suitable period of use, for example, weeks, months, and years of repeated installation and removal.

Veneer body 102 may be formed in any suitable manner. For example, veneer body 102 may include a monolithic construction, or veneer body 102 may include a plurality of pieces, bodies, and/or structures joined together to collectively form veneer body 102. More specifically, veneer body 102 may be shaped to form outward-facing surface 106 as a contiguous surface that defines at least some of, and optionally a substantial portion or all of, oral features 200. Alternatively, veneer body 102 may include one or more structures and/or bodies that are affixed, adhered, and/or bonded together to define portions of outward-facing surface 106, such as one or more oral features 200. Likewise, veneer body 102 may be shaped to form oral-facing surface 104 as a contiguous surface. Alternatively, customized temporary veneer 100 may include one or more structures and/or bodies affixed, bonded, and/or adhered together to form multiple surfaces that collectively define oral-facing surface 104. At least a portion of veneer body 102 may comprise a solid construction, in which oral-facing surface 104 and outward-facing surface 106 form opposed surfaces of a common body, or a collection of joined bodies. Additionally or alternatively, at least a portion of veneer body 102 may include a hollow construction, in which oral-facing surface 104 and outward-facing surface 106 are formed in separated structures or bodies that are spaced apart along a thickness 108 of veneer body 102.

Veneer body 102 may be formed from any suitable one or more materials. Generally speaking, the materials that form veneer body 102 may be those typically utilized in dentistry, orthodontics, and/or selected for compatibility with the oral environment (e.g., saliva, etc.). As examples, veneer body 102 may include one or more plastic materials, one or more polymeric materials, one or more thermoset plastics, one or more thermoplastics, one or more resilient or flexible materials, one or more resins, one or more adhesives, one or more metals, and/or one or more ceramics. For examples in which veneer body 102 includes a plurality of pieces, bodies, and/or structures that collectively form veneer body 102, each piece, body, and/or structure may be formed of one or more of the same or different materials as at least one other piece, body, and/or structure of veneer body 102.

Veneer body 102 may be shaped to at least substantially follow an arch form of dental arch 301 within target region 400. In other words, veneer body 102 may conform to the general shape or contour of dental arch 301 within target region 400. Oral-facing surface 104 may be shaped to closely follow, or closely conform to, the vestibular profile of target region 400, while outward-facing surface 106 may be shaped to present the desired oral appearance. In other words, oral-facing surface 104 may be shaped differently from outward-facing surface 106.

Veneer body 102 comprises a thickness 108 that is measured between oral-facing surface 104 and outward-facing surface 106. Thickness 108 may vary along veneer body 102, such as to afford oral-facing surface 104 with a different shape than outward-facing surface 106. As examples, thickness 108 of veneer body 102 along regions of veneer body 102 in which oral-facing surface 104 is configured to extend directly adjacent to a tooth 302 or natural gum 332 may be at least 0.2 millimeter (mm), at least 0.4 mm, at least 0.6 mm, at least 0.8 mm, at least 1 mm, at least 1.2 mm, at least 1.5 mm, at least 1.6 mm, at least 1.8 mm, at least 2 mm, at least 2.5 mm, at least 3 mm, at most 0.6 mm, at most 0.8 mm, at most 1 mm, at most 1.2 mm, at most 1.5 mm, at most 1.6 mm, at most 1.8 mm, at most 2 mm, at most 2.5 mm, at most 3 mm, and/or at most 5 mm. As discussed in more detail herein, in some examples, oral-facing surface 104 may be configured to extend within spaces, such as gingival embrasures 326 and/or gaps 320 in target region 400. In such examples, thickness 108 of veneer body 102 along these regions may be at least 0.8 mm, at least 1 mm, at least 2 mm, at least 3 mm, at least 4 mm, at least 5 mm, at least 6 mm, at most 1 mm, at most 2 mm, at most 3 mm, at most 4 mm, at most 5 mm, at most 6 mm, at most 8 mm, and/or at most 10 mm.

Customized temporary veneer 100 may be configured to span and obscure any suitable number or arrangement of teeth 302 within target region 400. As examples, customized temporary veneer 100 may be configured to span and obscure at least two teeth 302, at least three teeth 302, at least four teeth 302, at least five teeth 302, at least six teeth 302, at least seven teeth 302, at least eight teeth 302, at least ten teeth 302, at least twelve teeth 302, at most four teeth 302, at most five teeth 302, at most six teeth 302, at most seven teeth 302, at most eight teeth 302, at most ten teeth 302, at most twelve teeth 302, and/or an entire dental arch 301. Typically, customized temporary veneer 100 is configured to obscure at least some of the customer's anterior teeth, as the anterior teeth typically are the most visible of the customer's teeth. In some examples, customized temporary veneer 100 is configured to span and obscure a symmetrical arrangement of teeth 302, such as an equal number of teeth 302 on either side of the midline of customer's mouth 300. In other examples, customized temporary veneer 100 is configured to span and obscure an asymmetrical arrangement of teeth 302, such as an unequal number of teeth 302 on either side of the midline of the customer's mouth 300.

As mentioned, target region 400 may be included in the customer's maxilla 352 or mandible 350, and customized temporary veneer 100 correspondingly may be configured to be temporarily installed in the customer's maxilla 352 or mandible 350. For examples in which target region 400 is comprised in the customer's maxilla 352, customized dental arch veneer 100 may be referred to as a maxillary customized temporary veneer. Similarly, for examples in which target region 400 is comprised in the customer's mandible 350, customized dental arch veneer 100 may be referred to as a mandibular customized temporary veneer. Customized temporary veneer 100 may be configured to fit the specific needs of customer 10. These specific needs may include selection of oral features 200 and/or an oral-facing surface 104 that is specifically designed for customer's mouth 300 and/or the customer's desired oral appearance. With this in mind, customized temporary veneer 100 additionally or alternatively may be referred to herein as a customer-specific temporary veneer and/or a tailored temporary veneer.

As referred to herein, oral-facing surface 104 being configured to support customized temporary veneer 100 relative to target region 400 by engagement with vestibular surface(s) 304 may include oral-facing surface 104 being configured to support at least a substantial portion of the operable load of customized temporary veneer 100 on and/or by engagement with vestibular surface(s) 304. For example, oral-facing surface 104 may be configured to support customized temporary veneer 100 relative to target region 400 solely by engagement with the one or more vestibular surfaces 304. As another example, oral-facing surface 104 may be configured to support customized temporary veneer 100 relative to target region 400 without engaging a lingual surface 308 of any teeth 302 within customer's mouth 300. As a further example, oral-facing surface 104 may be described as comprising at least one, and optionally a plurality of, engaging surfaces, each being configured to directly engage a tooth 302 within target region 400. In some examples, at least 70% of a total area of the engaging surface(s) is configured to engage vestibular surfaces 304 of teeth 302. As yet another example, oral-facing surface 104 may be configured and/or shaped such that less than 30%, less than 20%, less than 10%, less than 5%, and/or less than 2% of the area thereof contacts, or extends adjacent to, occlusal surfaces 309 and/or lingual surfaces 308 of teeth 302 in customer's mouth 300. As a further example, oral-facing surface 104 also may be shaped to be non-contacting with an occlusal surface 309 and/or lingual surface 308 of any teeth 302 within customer's mouth 300 when customized temporary veneer 100 is installed in customer's mouth 300. As shown in FIG. 1, each tooth 302 may define a lingual height of contour 376 along lingual surface 308, which is on the cingulum for anterior teeth. In some examples, oral-facing surface 104 is configured to support customized temporary veneer 100 relative to target region 400 without engaging any portion of a lingual surface 304 that is on the gingival side of the lingual height of contour 376. In other words, oral-facing surface 104 may only contact portions of lingual surface 308 that are on the coronal side of the lingual height of contour 376. Such configurations of oral-facing surface 104 may reduce a propensity of customized temporary veneer 100 to interfere with the customer's speech, drinking, and/or mastication while wearing customized temporary veneer 100.

As mentioned, oral-facing surface 104 may include one or more engaging surfaces configured to directly engage or contact teeth 302 within target region 400 to support customized temporary veneer 100 relative to target region 400. For example, oral-facing surface 104 may include one or more vestibular-engaging surfaces 124 configured to engage one or more vestibular surfaces 304 of teeth 302. As examples, these vestibular surfaces 304 may include buccal surfaces 306, labial surfaces 307 of teeth 302 and/or vestibular surface(s) 304 defined by subtractive retention structure 374. Vestibular-engaging surfaces 124 also may be configured to engage vestibular surfaces 304 defined by an additive retention structure 330. As another example, oral-facing surface 104 and/or vestibular-engaging surfaces 124 may include one or more distal-engaging surfaces 110 configured to engage one or more distal surfaces 358 of teeth 302 within target region 400 and/or one or more mesial-engaging surfaces 112 configured to engage one or more mesial surfaces 356 within target region 400. In some examples, oral-facing surface 104 includes at least one pair of distal-engaging surfaces 110 disposed along opposed regions of oral-facing surface 104 and configured to engage corresponding distal surfaces 358 positioned on either side of the midline of customer's mouth 300. Such a configuration of oral-facing surface 104 may aide in retaining customized temporary veneer 100 against being dislocated mesially from target region 400.

In some examples, oral-facing surface 104 comprises one or more space-filling protrusions configured to extend within a space between and/or proximate teeth 302 of target region 400 and contact at least one proximal surface (e.g., mesial surface 356 or distal surface 358) of the teeth 302 proximate to the space. As a more specific example, oral-facing surface 104 may include at least one embrasure-filling protrusion 114 that is configured to extend within a gingival embrasure 326 of target region 400. Embrasure-filling protrusion 114 may include a distal-engaging surface 110 and/or a mesial-engaging surface 112 configured to contact the teeth 302 proximate to gingival embrasure 326. As another more specific example, oral-facing surface 104 may include a gap-filling protrusion 116 configured to extend within a gap 320 corresponding to one or more missing teeth within target region 400, and gap-filling protrusion 116 may include a distal-engaging surface 110 and/or a mesial-engaging surface 112 configured to contact the teeth 302 proximate to gap 320.

In some examples, oral-facing surface 104 includes one or more incisal ledges 118 (shown in FIG. 4), each being configured to engage an incisal edge 310 of an anterior tooth within target region 400. Incisal ledges 118 may prevent customized temporary veneer 100 from being pushed gingivally, or towards the adjacent natural gum 332, from the desired veneer position within target region 400. Each incisal ledge 118 may extend generally in a lingual direction to extend beneath the corresponding incisal edge 310 within target region 400. Incisal ledge 118 also may be shaped to hook around (i.e., extend around) incisal edge 310 and contact a portion of lingual surface 308, such as less than 1 mm of lingual surface 308, of the corresponding tooth 302. This feature may prevent customized temporary veneer 100 from being dislodged mesially from the desired veneer location within target region 400. As yet another example, oral-facing surface 104 may include one or more surfaces configured to engage, hook around, and/or embrace one or more dental undercuts 328 of teeth 302 within target region 400.

Customized temporary veneer 100 may be configured to engage prepared teeth and/or unprepared teeth. As discussed herein, unprepared teeth may include teeth 302 that have not been artificially modified, such as discussed herein with respect to prepared teeth 368. Unprepared teeth also may be referred to as natural teeth or unmodified teeth. In other words, unlike a permanent veneer, oral-facing surface 104 may be configured to retain customized temporary veneer 100 within customer's mouth 300 by engagement with teeth 302 that have not been prepared for installation of a permanent veneer therealong. This way, customer 10 can wear customized temporary veneer 100 without and/or before having their teeth modified. However, as mentioned, target region 400 may include one or more prepared teeth 368, and oral-facing surface 104 may be configured to selectively engage one or more prepared teeth 368.

More specifically, as discussed herein and shown in FIG. 1, target region 400 may include one or more additively prepared teeth 370, each having an additive retention structure 330 affixed to the corresponding tooth 302. Each additive retention structure 330 may include one or more vestibular surfaces 304, and oral-facing surface 104 may be configured to selectively engage these vestibular surfaces 304. Each additive retention structure 330 may be affixed to a vestibular surface 304 of a tooth 302 within target region 400 and protrude in the vestibular direction from tooth 302. Target region 400 additionally or alternatively may include one or more subtractively prepared teeth 372, each having a subtractive retention structure 374 defined in the corresponding tooth 302. Each subtractive retention structure 374 may be recessed into vestibular surface 304 of the corresponding tooth 302. Each subtractive retention structure 374 may include one or more vestibular surfaces 304, and oral-facing surface 104 may be configured to selectively engage these vestibular surfaces 304.

For example, oral-facing surface 104 of customized temporary veneer 100 may include one or more retention structure-engaging surfaces 120. Each retention structure-engaging surface 120 may be specifically shaped and/or configured to selectively engage a specific additive retention structure 330 or a specific subtractive retention structure 374. Likewise, additive retention structures 330 and/or subtractive retention structures 374 may be specifically configured to engage customized temporary veneer 100 and/or provide an anchoring point for customized temporary veneer 100. As more specific examples, additive retention structure 330 may include a protrusion, and retention structure-engaging surface 120 may include a correspondingly shaped slot, groove, recess, or sleeve configured to selectively receive and engage the protrusion. As another example, additive retention structure 330 may include a sleeve, recess, groove, and/or slot, and retention structure-engaging surface 120 may include a correspondingly shaped protrusion configured to be selectively received in and engage the sleeve, recess, groove, and/or slot of additive retention structure 330. As yet another example, subtractive retention structure 374 may include one or more grooves formed in vestibular surface 304 of a tooth 302, and retention-engaging surface 120 may include one or more correspondingly shaped protrusions, tabs, and/or ridges configured to be selectively inserted into the grooves and engage the vestibular surface(s) 304 defined therein.

In some examples, veneer body 102 is configured to urge and/or retain oral-facing surface 104 in engagement with the one or more vestibular surfaces 304 of customer's mouth 300. More specifically, veneer body 102 may be configured to resiliently bias oral-facing surface 104 into engagement with the or more vestibular surfaces 304 when customized temporary veneer 100 is installed in customer's mouth 300. For example, as shown in FIG. 1, dental arch 301 may define a dental arch span 360 that is measured transverse to the midline of customer's mouth 300 and between opposed vestibular surfaces 304 of corresponding teeth 302 positioned on either side of the midline. For example, dental arch span 360 may be measured between buccal surfaces 306 of the two canine teeth of dental arch 301. As shown in FIG. 2, oral-facing surface 104 may define an interior arch span 122 corresponding to the dental arch span 360 of target region 400. As referred to herein, "corresponds to" in this context means that interior arch span 122 is measured between regions of oral-facing surface 104 that are configured to be positioned immediately adjacent to, and/or engage, the vestibular surfaces 304 of dental arch 301 between which dental arch span 360 is measured.

Oral-facing surface 104 may be shaped such that interior arch span 122 thereof nominally is less than the corresponding dental arch span 360 of dental arch 301. As referred to herein, "nominally" in this context refers to the resting, or un-flexed, interior arch span 122. Veneer body 102 may resiliently bias oral-facing surface 104 towards, or to have, this nominal interior arch span 122. Veneer body 102 also may be configured to resiliently flex to permit widening of interior arch span 122 of oral-facing surface 104 and to permit oral-facing surface 104 to be moved into engagement with vestibular surfaces 304. In such a configuration, oral-facing surface 104 engages vestibular surfaces 304 with an interior arch span 122 thereof that is greater than the nominal interior arch span 122 and/or is substantially the same as the corresponding dental arch span 360, and veneer body 102 applies a restoring force to urge oral-facing surface 104 into engagement with these vestibular surfaces 304. In other words, customized temporary veneer 100 may be configured to resiliently "snap" onto vestibular surfaces 304 of target region 400.

As mentioned, oral-facing surface 104 may be shaped to closely follow the vestibular profile of target region 400, with the engaging surfaces of oral-facing surface 104 being configured to directly contact teeth 302 and/or retention structures within target region 400. Oral-facing surface 104 also may include non-contacting regions that extend between, or outside of, the engaging surfaces. These non-contacting regions may "closely follow" the vestibular profile of target region 400 by extending at a threshold separation from corresponding teeth 302 and/or natural gum 332 within target region 400 when customized temporary veneer 100 is installed in customer's mouth 300. In other words, oral-facing surface 104 may be shaped such that the engaging surfaces directly contact teeth 302 and the non-contacting regions of oral-facing surface 104 are supported spaced apart from corresponding regions of target region 400 by the threshold separation when customized temporary veneer 100 is installed in customer's mouth 300. In some examples, this threshold separation may permit oral fluids (e.g., saliva) to flow between target region 400 and the non-contacting regions of oral-facing surface 104. As examples, this threshold separation may be at least 0.05 mm, at least 0.1 mm, at least 0.15 mm, at least 0.2 mm, at least 0.25 mm, at least 0.3 mm, at least 0.4 mm, at least 0.5 mm, at most 0.1 mm, at most 0.15 mm at most 0.2 mm, at most 0.25 mm, at most 0.3 mm, at most 0.4 mm, at most 0.5 mm, and/or at most 1 mm.

With continued reference to FIGS. 2-4, customized temporary veneer 100 may include any suitable selection of oral features 200. Generally speaking, oral features 200 include artificial oral structures and customized features pertaining to these artificial oral structures. As discussed in more detail herein, the selection of oral features 200 may be customized for customer 10, selected by customer 10, and/or selected to accommodate the needs or desires of customer 10.

Oral features 200 typically include a plurality of individual tooth veneers 202 and one or more features pertaining to each individual tooth veneer 202. Each individual tooth veneer 202 may be configured to obscure a corresponding tooth 302 or gap 320 within target region 400 and present a desired tooth appearance in lieu of the natural appearance of tooth 302 or gap 320. As such, individual tooth veneers 202 may include anterior individual tooth veneers, incisor individual tooth veneers, central incisor individual tooth veneers, lateral incisor individual tooth veneers, canine individual tooth veneers, premolar individual tooth veneers, and/or molar individual tooth veneers. Customized temporary veneer 100 also may include any suitable number of individual tooth veneers, such as at least two, at least three, at least four, at least five, at least six, at least seven, at least eight, at least ten, at least twelve, at most four, at most five, at most six, at most seven, at most eight, at most ten, at most twelve, and/or an entire dental arch of individual tooth veneers 202.

Oral features 200 also may include a selection and/or arrangement of individual tooth veneers 202. For example, a selection of individual tooth veneers 202 may include a group of individual tooth veneers, such as anterior individual tooth veneers, which include four individual tooth veneers 202, or anterior and pre-molar individual tooth veneers, which include eight individual tooth veneers 202. The arrangement of individual tooth veneers 202 may include a desired orientation of each individual tooth veneer 202, a desired alignment of the plurality of individual tooth veneers 202, a desired spacing between adjacent individual tooth veneers 202, and/or a desired overall arch form defined by the plurality of individual tooth veneers 202. Typically, the arrangement of individual tooth veneers 202 is different from an arrangement of corresponding teeth 302 within target region 400, such that customized temporary veneer 100 presents a desired oral appearance that is different from the natural appearance of target region 400. In some examples, the desired overall arch form defined by the plurality of individual tooth veneers 202 is widened relative to the overall arch form of target region 400, such that customized temporary veneer 100 presents an increased smile width relative to the customer's natural smile width. This may be achieved by increasing the thickness 108 of veneer body 102 such that individual tooth veneers 202 protrude further in the vestibular direction from target region 400.

Oral features 200 further may include a selected veneer shade, veneer texture, veneer color, veneer shape, and/or veneer size of each individual tooth veneer 202, each of which may be the same as or different from one or more other individual tooth veneers 202. As a more specific example, the veneer texture may include an ideal tooth texture, a glossy texture, a matte texture, a grooved texture, and/or a smooth texture. The veneer color may include an ideal tooth color, a natural tooth color, a bright white color, an off-white color, and/or a color that is selected to match or be a slight improvement of the color of the customer's teeth 302. As more examples, the veneer shade of any given individual tooth veneer 202 may be any of shades A1-A4, BL1-BL4, B1-B4, C1-C4, and D1-D4. More specific examples of tooth shades are disclosed in U.S. Pat. No. 6,561,800, the entire disclosure of which is hereby incorporated by reference. The veneer shape of each individual tooth veneer 202 may be selected generally based upon the specific type of individual tooth veneer 202 (e.g., the general shape of a central incisor), while the specific shape of each individual tooth veneer 202 may be selected to be an idealized version of the customer's corresponding tooth 302 and/or to be a generically idealized version of the particular type of individual tooth veneer 202. The veneer size of each individual tooth veneer 202 also may be selected based on the customer's corresponding tooth 302, such as to be at least substantially similar to, slightly larger than, or a preferred variant of, the size of the customer's corresponding tooth 302.

Oral features 200 also may include a custom gum structure 204 and one or more features pertaining to custom gum structure 204. Custom gum structure 204 may be configured to obscure at least a portion of natural gum 332 within target region 400 and present a desired gum appearance to customer's mouth 300. An extent of custom gum structure 204 may be selected based upon the selection and/or arrangement of individual tooth veneers 202, such that custom gum structure 204 extends along a corresponding region of target region 400 as individual tooth veneers 202. Oral features 200 also may include a selected gum shape, gum color, and/or gum texture, of custom gum structure 204. For example, custom gum structure 204 may be colored to resemble natural gum 332, or may be colored to present a desired appearance of the natural gum 332. Likewise, custom gum structure 204 may be shaped and/or textured to resemble natural gum 332 or may be shaped and/or textured to present a desired appearance of natural gum 332.

Individual temporary veneers 202 and/or customized gum structure 204 additionally or alternatively may be colored, shaped, and/or textured to present a novelty appearance. As examples, custom gum structure 204 and/or individual tooth veneers 202 may be provided with bright, dark, pastel, or non-natural tooth colors (e.g., red, blue, black, or green) and/or images or indicia, such as for holidays, birthdays, special occasions, and/or for customers that are interested in presenting non-traditional oral appearances with customized temporary veneer 100.

Oral features 200 may be provided to veneer body 102 to define at least a portion of outward-facing surface 106 in any suitable manner. For example, one or more individual tooth veneers 202 may be shaped into veneer body 102 to form integral portions thereof. Additionally or alternatively, one or more individual tooth veneers 202 may be formed separately from veneer body 102 and attached, adhered, and/or otherwise applied thereto. Likewise, custom gum structure 204 may be shaped into veneer body 102 and/or shaped separately from veneer body 102 and applied thereto. The shaping and/or forming of individual tooth veneers 202 and/or custom gum structure 204 also may include applying the desired texture thereto. The desired color and/or tint of each individual tooth veneer 202 and/or custom gum structure 204 may be created by embedding the desired color and/or tint into the material from which individual tooth veneer 202 and/or custom gum structure 204 is formed. Additionally or alternatively, each individual tooth veneer 202 and/or custom gum structure 204 may be colored and/or tinted by applying the desired color and/or tint to the appropriate region of outward-facing surface 106, such as after the individual tooth veneer 202 and/or custom gum structure 204 has been provided thereto.

FIGS. 2-4 also provide examples of kits 250 that include a plurality of customized temporary veneers 100, according to the present disclosure. Kit 250 may be configured to permit customer 10 to try out, or test, a plurality of different oral appearances by trying on, selectively installing, wearing, and/or interchanging, at least some of customized temporary veneers 100 that make up kit 250. More specifically, each customized temporary veneer 100 comprised in kit 250 may include a respective selection of oral features 200, and the respective selection of oral features 200 comprised in each customized temporary veneer 100 may be different from that included in at least one other customized temporary veneer 100 of kit 250. In other words, each customized temporary veneer 100 comprised in kit 250 may be configured to present a respective outward appearance that is different from the respective oral appearance presented by at least one other customized temporary veneer 100. In some examples, each customized temporary veneer 100 is configured to present a respective outward appearance, or comprises a respective selection of oral features 200, that is different from every other customized temporary veneer 100 of kit 250. In such examples, each customized temporary veneer 100 is configured to present a unique outward appearance.

Unlike outward-facing surface 106, oral-facing surface 104 of each customized temporary veneer 100 included in kit 250 may be at least substantially similar, and optionally the same as, oral-facing surface 104 of at least one other, and optionally every other, customized temporary veneer 100 included in kit 250. In other words, oral-facing surface 104 may be tailored or customized similarly for customer's mouth 300, such that each customized temporary veneer 100 of kit 250 may be worn by customer 10 in a similar manner. Alternatively, oral-facing surface 104 of one or more customized temporary veneers 100 of kit 250 may be different from that of at least one other customized temporary veneer 100 of kit 250. This difference in oral-facing surface 104 may permit customer 10 to test out different customized temporary veneer fits. Additionally or alternatively, this difference in oral-facing surface 104 may accommodate the difference in oral features 200, such as customized temporary veneers 100 having custom gum structures 204 of a different size or shape and/or customized temporary veneers 100 having a different number, selection, and/or arrangement of individual tooth veneers 202.

Kit 250 additionally or alternatively may include at least one customized temporary veneer 100 and one or more auxiliary features that the customer 10 may utilize to install and/or modify the customized temporary veneer 100. For example, kit 250 may include one or more additive retention structures 330 and optionally may include adhesive for attaching the additive retention structures 330 to teeth 302. As another example, kit 250 may include paints or pigments that the customer 10 selectively may utilize to change the color of individual tooth veneers 202 and/or customized gum structure 204. As yet another example, kit 250 may include one or more additional individual tooth veneers 202 that are separate from customized temporary veneer 100 and that customer 10 may selectively attach to customized temporary veneer 100 to modify the outward appearance thereof, such using an adhesive provided in kit 250.

Figure 5:
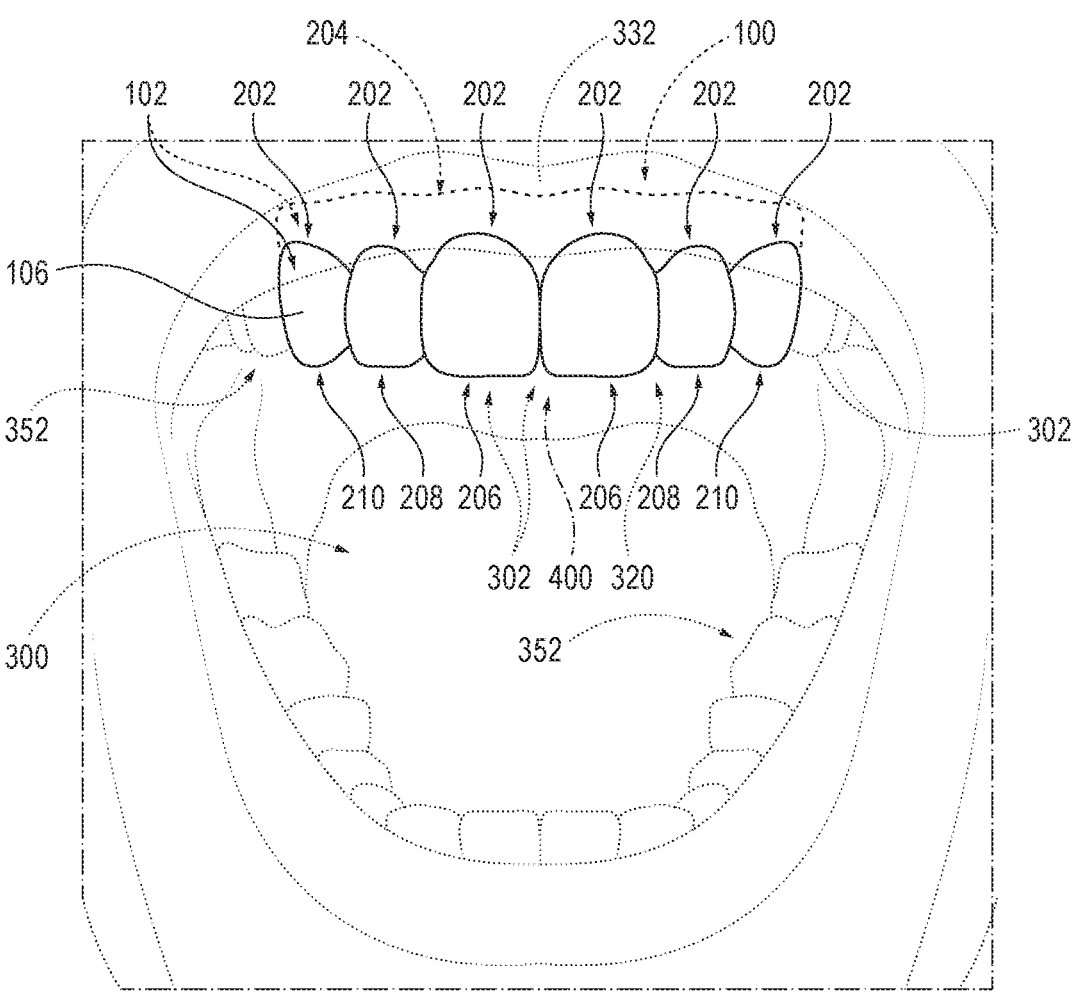
FIG. 5 is a less-schematic illustration of examples of customized temporary veneers installed in a customer's mouth, according to the present disclosure.
Figure 6:
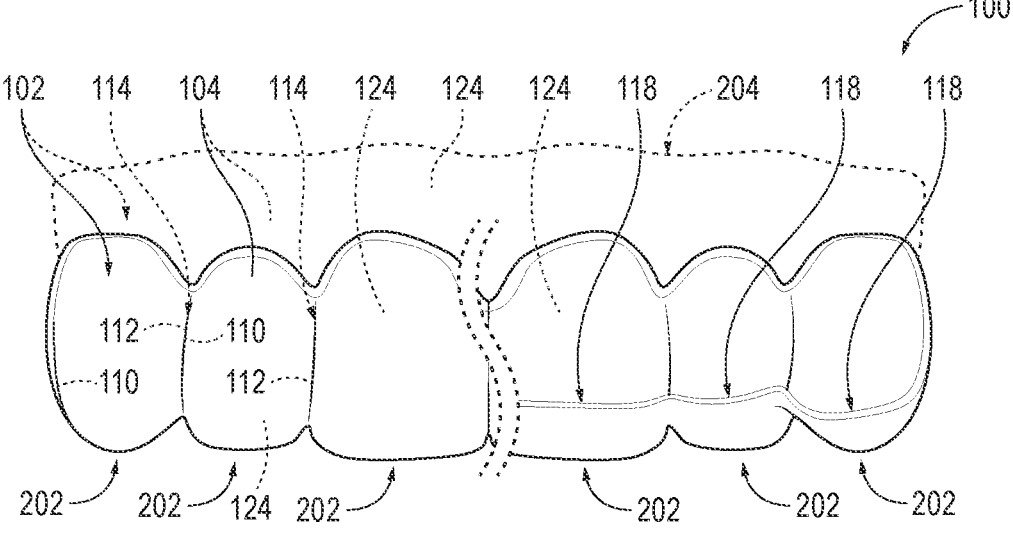
FIG. 6 is a less-schematic illustration an oral-facing surface of the examples of customized temporary veneers of FIG. 5.
Figure 7:
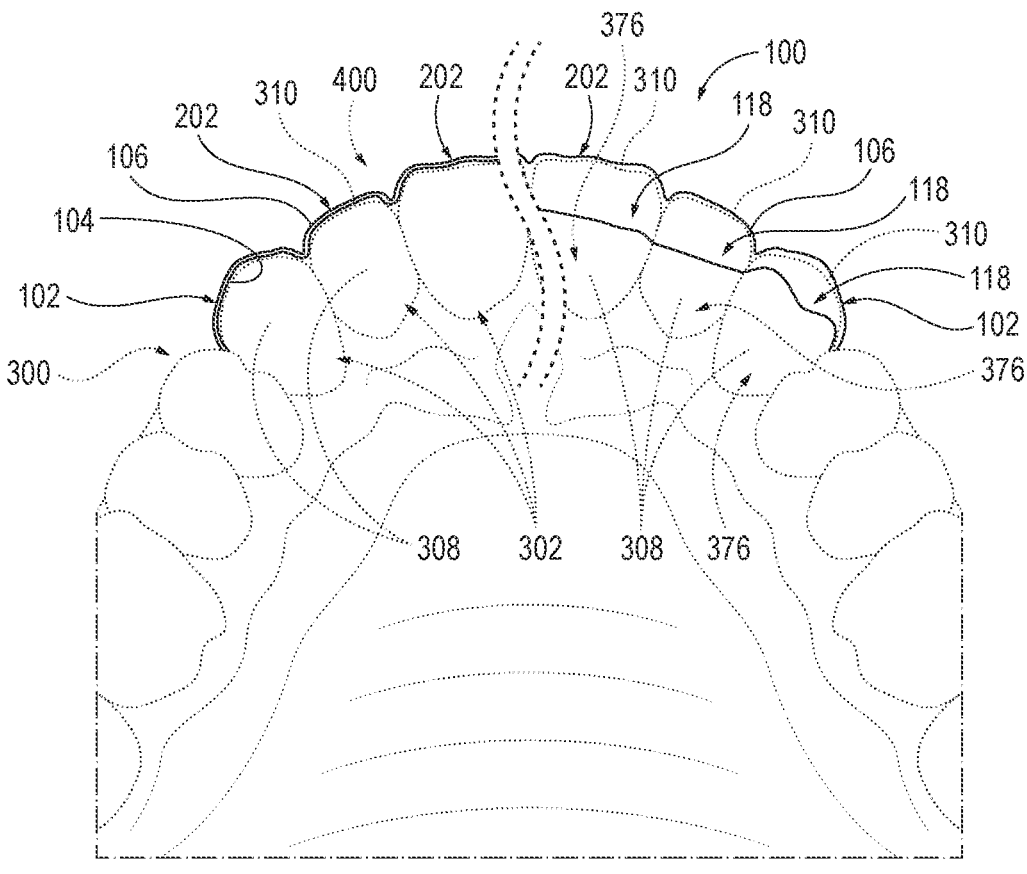
FIG. 7 is a less schematic bottom plan view showing the examples of customized temporary veneers of FIG. 5 installed in a customer's mouth.

FIGS. 5-7 provide somewhat less schematic representations of examples of customized temporary veneers 100 according to the present disclosure. More specifically, FIG. 5 is a front elevation view showing the example customized temporary veneers 100 installed in customer's mouth 300 and obscuring target region 400 thereof. FIG. 6 is a rear elevation view showing the oral-facing surface 104 of the example customized temporary veneers 100. FIG. 7 is a bottom plan view showing the example customized temporary veneers 100 installed in customer's mouth 300. The customized temporary veneers 100 of FIGS. 5-7 may include and/or be more detailed examples of the customized temporary veneers 100 of FIGS. 2-4, and any of the structures, functions, and/or features discussed herein with reference to customized temporary veneers 100 of FIGS. 2-4 may be included in and/or utilized with customized temporary veneers 100 of FIGS. 5-7 without departing from the scope of the present disclosure. Similarly, any of the structures, functions, and/or features discussed herein with reference to customized temporary veneers 100 of FIGS. 5-7 may be included in and/or utilized with customized temporary veneers 100 of FIGS. 2-4.

Generally, with reference to FIGS. 5-7, and with initial focus on FIG. 5, customized temporary veneer 100 includes veneer body 102 and a plurality of individual tooth veneers 202 formed in veneer body 102 and defining outward-facing surface 106 thereof. Veneer body 102 may be of a unitary construction such that individual tooth veneers 202 are formed in a contiguous body. In these examples, customized temporary veneer 100 includes four individual tooth veneers: two central incisor individual tooth veneers 206, two lateral incisor individual tooth veneers 208, and two canine individual tooth veneers 210. As shown, each individual tooth veneer 202 is sized and shaped to obscure a corresponding existing tooth 302, or a gap 320 corresponding to an existing tooth, in target region 400 and present a desired appearance in replacement of the natural appearance of tooth 302 or gap 320. Customized temporary veneer 100 also may include custom gum structure 204 that extends above, or gingivally of, individual tooth veneers 202. Custom gum structure 204 is configured to obscure at least a portion of natural gum 332 in target region 400 and present a desire gum appearance in the vestibular direction thereof.

FIGS. 5-7 illustrate examples in which target region 400 is included in the maxilla 352 of customer's mouth 300, and customized temporary veneer 100 correspondingly is configured to be temporarily installed along maxilla 352. However, customized temporary veneers 100 may be constructed in a similar manner to the examples of FIGS. 5-7 but configured to obscure a target region in the mandible 350 of customer's mouth 300.

As shown in the example of FIG. 6, oral-facing surface 104 may define a contiguous surface, and oral-facing surface 104 may be integrally formed with individual tooth veneers 202. Oral-facing surface 104 may be shaped to closely follow the vestibular profile of target region 400, having a corresponding cavity or recess for receiving each tooth 302 in target region 400. Specially, oral-facing surface 104 may include a plurality of vestibular-engaging surfaces 124, such as discussed herein. Oral-facing surface 104 also may include a distal-engaging surface 110 and a mesial-engaging surface 112 for each tooth within target region 400. Oral-facing surface 104 also may include embrasure-filling protrusions 114, as discussed herein.

In these examples, oral-facing surface 104 may or may not include incisal ledges 118. As shown in FIG. 7, for examples in which oral-facing surface 104 does not include incisal ledges 118, oral-facing surface 104, and veneer body 102, may be shaped to terminate flush with the incisal edges 310 of the anterior teeth 302. For examples in which oral-facing surface 104 includes incisal ledges 118, incisal ledges 118 may extend beneath and engage incisal edges 310 of the anterior teeth. Incisal ledges 118 also may extend lingually of incisal edges 310, optionally to engage a small portion of lingual surface 308, for example, at most 5%, at most 10%, at most 15%, at most 20%, at most 25%, and/or at most 30% of the area of lingual surface 308. As further shown in FIG. 7, each tooth 302 in target region 400 includes lingual height of contour 376. Each incisal ledge 118 may not contact any portion of lingual surface 308 that is on the gingival side of the lingual height of contour 376. In other words, for examples in which incisal ledge 118 contacts lingual surface 308, incisal ledge 118 may only contact the portion of lingual surface 308 that is on the coronal side of lingual height of contour 376.

FIG. 8 provides a flowchart that represents illustrative, non-exclusive examples of methods 500, according to the present disclosure. FIG. 9 provides a flowchart that represents illustrative non-exclusive examples of methods 600 according to the present disclosure. In FIGS. 8 and 9, some steps are illustrated in dashed boxes, indicating that such steps are optional or correspond to an optional version of methods 500 or methods 600 according to the present disclosure. That said, not all methods 500 and/or methods 600 according to the present disclosure are required to comprise each of the steps illustrated in solid boxes. The methods and steps illustrated in FIGS. 8 and 9 are not limiting, and other methods and steps are within the scope of the present disclosure, including methods having greater than or fewer than the number of steps illustrated, as understood from the discussion herein.

Methods 500 comprise providing at least one customized temporary veneer according to the present disclosure. Methods 600 comprise utilizing at least one temporary veneer according to the present disclosure. Methods 500 may comprise providing the customized temporary veneers 100 illustrated and discussed herein in connection with FIGS. 2-7. Likewise, methods 600 may comprise utilizing the customized temporary veneers 100 illustrated and discussed herein with reference to FIGS. 2-7. That is, customized temporary veneers 100 illustrated and discussed herein with reference to FIGS. 2-7 may include any of the features, functions, properties, components, etc., as well as variants thereof, as those discussed herein with reference to methods 500 and FIG. 8 and/or methods 600 and FIG. 9 without requiring the inclusion of all such features, functions, components, etc. Likewise, customized temporary veneers 100 discussed herein in connection with methods 500 and/or FIG. 8 and methods 600 and/or FIG. 9 may incorporate any of the features, functions, properties, components, etc., as well as variants thereof, as those discussed herein with reference to FIGS. 2-7 without requiring the inclusion of all such features functions, components, etc.

With reference to FIG. 8, methods 500 include providing at least one customized temporary veneer 100 and may include providing a plurality of customized temporary veneers 100, as discussed in more detail herein. For examples in which methods 500 include providing a plurality of customized temporary veneers 100, methods 500 may include providing the kit 250 of customized temporary veneers 100 discussed herein. Methods 500 may include providing at least one maxillary customized temporary veneer and/or at least one mandibular customized temporary veneer, such as discussed herein.

As shown in FIG. 8, methods 500 include obtaining 505 a representation of a target region of a customer's mouth, selecting 510 a plurality of oral features to be presented by the customized temporary veneer, and creating 525 the customized temporary veneer. The creating comprises forming 530 a veneer body of the customized temporary veneer, providing 535 oral features to an outward-facing surface of the veneer body, and shaping 540 an oral-facing surface of the veneer body. Methods 500 may include preparing 515 teeth within target region 400 of the customer's mouth, analyzing 520 the representation of the target region, receiving 545 feedback from the customer, producing 550 a modified customized temporary veneer, creating 555 a permanent veneer design, and/or installing 560 a permanent veneer.

The obtaining 505 may be performed in any suitable manner such that a suitable representation of the target region 400 is obtained. As examples, the obtaining may include obtaining one or more images of the target region 400, and/or obtaining a mold of the target region. Examples of methods for obtaining a mold of a customer's teeth that may be utilized during the obtaining at 505 are disclosed in U.S. Pat. No. 7,771,640, the entirety of which is hereby incorporated by reference. The obtaining at 505 additionally or alternatively may include obtaining one or more digital scans of the target region and additionally or alternatively may include one or more computer-aided tomography scans (CAT scans), images produced by magnetic resonance imaging (MRI), and/or digitalized X-ray scans. Examples of methods for obtaining a digital representation of a customer's teeth that may be utilized during the obtaining at 505 are disclosed in U.S. Pat. No. 6,450,807, the entirety of which is hereby incorporated by reference.

The obtaining 505 may be performed by any suitable party. In some examples, the obtaining at 505 is performed by a dental practitioner, which may include an orthodontist, a surgeon, a dentist, and/or a technician. In other words, the obtaining 505 may be performed by the dental practitioner in the presence of the customer. In some such examples, the obtaining 505 includes scanning the target region 400 of the customer's mouth 300 and/or taking a dental impression of the target region 400 of the customer's mouth 300. Additionally or alternatively, the obtaining 505 may be performed by the customer 10, in which the customer 10 may submit the representation to the practitioner. As an example, the obtaining 505 may include the customer taking one or more images of the target region and submitting the one or more images to the dental practitioner. In such an example, the providing of the images to the dental practitioner also may be considered to be a version of the dental practitioner receiving the representation. The obtaining 505 also may include preparing the representation of the target region of the customer's mouth from the one or more images of the target region 400 provided by the customer and/or of a dental impression provided by the customer.

As discussed herein, the target region 400 may be included in the customer's maxilla 352, in which case, methods 500 include providing at least one maxillary customized temporary veneer. As also discussed herein, the target region 400 may be included in the customer's mandible 350, in which case, methods 500 include providing at least one mandibular customized temporary veneer. Accordingly, the obtaining 505 may include obtaining a representation of the customer's maxilla 352 and/or of the customer's mandible 350.

The obtaining 505 may be performed with any suitable sequence or timing within methods 500 such as prior to or subsequent to the selecting at 510, prior to the installing at 515, prior to the analyzing at 520 and/or prior to the creating at 525.

Methods 500 further include selecting 510 a plurality of oral features to be presented by the customized temporary veneer. The selecting 510 may be performed by the dental practitioner, and/or the selecting 510 may be performed by the dental practitioner responsive to an indication by the customer 10. The selecting 510 may be performed based on the customer's desires, in anticipation of the customer's desires, or responsive to desires expressed by the customer.

As mentioned, oral features 200 may include artificial oral structures and customized features pertaining to the artificial oral structures. Thus, the selecting 510 may include selecting which and/or how many of the artificial oral structures to be included in the customized temporary veneer. For example, the selecting 510 may include selecting to include a custom gum structure 204 in the customized temporary veneer 100. The selecting 510 also may include selecting a selection and/or arrangement of individual tooth veneers 202 to be included in the customized temporary veneer 100, such as discussed herein. For example, selecting the arrangement of the individual tooth veneers 202 may include selecting a desired orientation of each individual tooth veneer, a desired alignment of the selection of individual tooth veneers, a desired spacing between the individual tooth veneers, and/or a desired overall arch form defined by the plurality of individual tooth veneers.

The selecting 510 also may include selecting one or more customized features pertaining to the selected individual tooth veneers 202 and/or the custom gum structure 204. For example, the selecting 510 may include selecting a veneer shade, a veneer texture, a veneer color, a veneer shape, and/or a veneer size of each individual tooth veneer 202, such as discussed herein. Similarly, the selecting 510 may include selecting a preferred gum shape, gum color, and/or gum texture of the custom gum structure 204, such as discussed herein.

In some examples, the selecting 510 is performed based on the representation of the target region 400 obtained at 505. For example, the selecting 510 may include selecting selection and/or arrangement of individual tooth veneers 202 to obscure one or more gaps 320 corresponding to missing teeth, one or more misaligned teeth 316, one or more damaged teeth 318, and/or one or more surgical sites 322 identified in the representation of target region 400. As another example, the selecting 510 may include selecting a size of each individual tooth veneer 202 to completely cover and/or obscure a corresponding tooth 302 and/or gap 320 within target region 400.

In view of the above, the selecting 510 may be described as selecting a desired outward appearance of the customized temporary veneer 100. For examples in which methods 500 include providing a plurality of customized temporary veneers 100, the selecting 510 may include selecting a respective plurality of oral features to be presented by each customized temporary veneer 100. As mentioned, this may include selecting 510 the respective plurality of oral features presented by each customized temporary veneer 100 to be different from that presented by at least one other customized temporary veneer 100. In other words, the selecting 510 may include selecting the outward appearance of each customized temporary veneer 100 to be different from at least one other customized temporary veneer 100. As also mentioned, this may allow the customer to try on a plurality of different outward appearances, or veneer-modified oral appearances, by selectively wearing the plurality of customized temporary veneers 100.

In some examples, methods 500 include presenting one or more proposed veneer-modified representations of the target region 400 from which the customer 10 may select the plurality of oral features 200. For example, methods 500 may include presenting, such as by the dental practitioner, one or more images, digital representations, and/or models of the target region 400 showing a proposed customized temporary veneer 100 installed therein and presenting a plurality of proposed oral features 200 from which the customer may select the plurality of oral features 200.

With continued reference to FIG. 8, methods 500 may include preparing 515 one or more teeth within target region 400. The preparing 515 may include producing one or more prepared teeth 368, such as one or more subtractively prepared teeth 372 and/or one or more additively prepared teeth 370, as discussed herein. For example, the preparing 515 may include installing one or more additive retention structures 330 on one or more teeth 302 within the target region 400 of the customer's mouth 300. Additionally or alternatively, the preparing 515 may include forming one or more subtractive retention structures 374 on one or more teeth 302 within the target region 400. More specific examples of the additive retention structures 330 and the subtractive retention structures 374 are discussed herein. The preparing 515 may include installing the one or more additive retention structures 330 and/or the one or more subtractive retention structures 374 on one or more vestibular surfaces 304 of teeth 302 in target region 400. The preparing 515 also may include specifically configuring each additive retention structure 330 and/or each subtractive retention structure 374 to engage with an oral-facing surface 104 of the customized temporary veneer 100. The preparing 515 may be performed by the dental practitioner and/or based on the representation of the target region 400. Additionally or alternatively, the preparing 515 may include providing the customer 10 with the one or more additive retention structures 330 and adhesive for attaching the additive retention structures 330 to the customer's teeth. The preparing 515 may be performed with any suitable sequence or timing within methods 500, such as subsequent to the obtaining 505, prior to the creating 525, subsequent to the creating 525, and/or subsequent to the receiving 545. More specifically, for examples in which the preparing 515 is performed subsequent to the creating 525, the customer 10 may be provided with customized temporary veneer 100, and optionally kit 250, to wear before deciding to have their teeth modified at 515. After deciding to have their teeth modified at 515, the customer 10 may continue to wear customized temporary veneer 100, or a selected subset of customized temporary veneers 100 from kit 250, subsequent to the preparing 515.

Methods additionally or alternatively may include analyzing 520 the representation of the target region. The analyzing 520 may include determining one or more specific dimensions of the target region 400 and/or identifying one or more features within the target region 400. For example, the analyzing 520 may include determining a vestibular profile of the target region, such as discussed herein. As another example, the analyzing 520 may include identifying and/or determining the dimensions of one or more gingival embrasures 326 within the target region 400, such as discussed herein. As yet another example, the analyzing 520 may include identifying and/or determining the dimensions of one or more dental undercuts 328 within the target region. As a further example, the analyzing 520 may include determining one or more dental arch spans 360 of the target region 400, such as discussed herein. As yet a further example, the analyzing 520 may include determining an arch form of the target region 400.

The analyzing 520 additionally or alternatively may include identifying one or more surfaces of the customer's teeth 302 to be engaged by the customized temporary veneer 100. For example, the analyzing 520 may include identifying one or more vestibular surfaces 304, one or more distal surfaces 358, one or more mesial surfaces 356, one or more buccal surfaces 306, and/or one or more labial surfaces 307 to be engaged by an oral-facing surface 104 of the customized temporary veneer 100. When included in methods 500, the analyzing 520 may be performed subsequent to the obtaining 505 and/or prior to the creating 525.

Methods 500 further include creating 525 the customized temporary veneer 100. For examples in which methods 500 include providing a plurality of customized temporary veneers 100, the creating 525 includes creating the plurality of customized temporary veneers 100. The creating 525 may be performed outside of, or without the direct use of, the customer's mouth 300. The creating 525 may be performed by the dental practitioner, by a manufacturer at the request of the dental practitioner, and/or based on instructions from the dental practitioner.

The creating 525 includes forming 530 a veneer body 102 of the customized temporary veneer 100. The forming 530 the veneer body 102 may be performed responsive to and/or based on the obtaining 505 and/or the analyzing 520. For example, the forming 530 may include forming the veneer body 102 to at least substantially follow the arch form of the dental arch 301 within target region 400. As another example, the forming 530 may include forming the veneer body 102 to span and obscure at least a portion of, and optionally the entirety of, the target region 400, such as a selected portion of dental arch 301 and/or a selected portion of natural gum 332.

The forming 530 may include forming the veneer body 102 in any suitable manner. More specifically, the forming 530 may include forming the veneer body 102 as a single body or as a monolithic construction. Alternatively, the forming 530 may include attaching one or more structures or bodies to one another to collectively define the veneer body 102. The forming 530 may be performed with any suitable manufacturing process. For example, the forming 530 may include additively manufacturing veneer body 102. More specific examples of suitable additive manufacturing processes include fused deposition modeling, sterolithography, and/or PolyJet 3D-printing. The forming 530 additionally or alternatively may include utilizing subtractive manufacturing, milling, machining, molding, injection molding, and/or casting to form the veneer body 102 and/or portions thereof. The forming 530 may include forming the veneer body 102 from any of the materials discussed herein that may be utilized to form the veneer body 102.

The creating 525 further includes providing 535 the plurality of oral features to an outward-facing surface 106 of the veneer body 102. As discussed herein, oral features 200 collectively are configured to present a desired oral appearance in a vestibular direction from the target region 400. Specifically, the providing 535 includes providing the plurality of oral features 200 selected during the selecting 510. For examples in which methods 500 include providing a plurality of customized temporary veneers 100, the providing 535 includes providing the respective plurality of oral features 200 to the veneer body 102 of each customized temporary veneer 100. In other words, the providing 535 includes providing different oral features 200 to two or more of the customized temporary veneers 100.

The providing 535, or portions thereof, may be performed substantially simultaneously with and/or as a portion of the forming 530. The providing 535 may include shaping the outward-facing surface 106 of the veneer body 102 to define at least some of the oral features 200. For example, the providing 535 may include shaping the oral-facing surface 104 to define the plurality of individual tooth veneers 202 and/or the custom gum structure 204. Additionally or alternatively, the providing 535 may include shaping one or more of the individual tooth veneers 202 and/or the custom gum structure 204 separately and attaching the one or more individual tooth veneers 202 and/or the custom gum structure 204 to the veneer body 102 to define at least a portion of the outward-facing surface 106 thereof. The providing 535 also may include texturing, coloring, and/or tinting each individual tooth veneer 202 and/or the custom gum structure 204, such as discussed herein. In some examples, the providing 535 includes applying a paint, finish, stain, and/or coating to the individual tooth veneers 202 and/or custom gum structure to provide the desired color, texture, and/or tint to the individual tooth veneers 202 and/or the custom gum structure 204. The providing 535 also may include embedding a selected color or pigment into the material from which the individual tooth veneers 202 and/or custom gum structure 204 are formed to provide the desired color or tint.

The providing 535 further may include forming each individual tooth veneer 202 in the selected shape and/or size. The providing 535 may include forming the individual tooth veneers 202 from a different material than that of the veneer body 102 and/or the custom gum structure 204. As an example, the providing 535 may include forming the individual tooth veneers 202 from a ceramic and forming the custom gum structure 204 from a resilient material that resembles the customer's natural gums 332. Alternatively, the providing 535 may include forming oral features 200 and veneer body 102 from at least substantially the same material, optionally with different colors or pigments added to tint or color individual tooth veneers 202 and/or custom gum structure 204.

The providing 535 may be performed with any suitable sequence or timing within the creating 525, such as prior to, at least substantially simultaneously with, or subsequent to, the shaping 540 and/or at least substantially simultaneously with, or subsequent to the forming 530.

The creating 525 further includes shaping 540 an oral-facing surface of the veneer body. The shaping 540 is based on the representation of the target region 400 obtained at 505. The shaping 540 includes shaping the oral-facing surface to selectively engage one or more vestibular surfaces 304 within the target region 400 and to selectively support the customized temporary veneer 100 relative to the target region 400 by engagement with the one or more vestibular surfaces 304. The shaping 540 may be performed as a portion of, or at least substantially simultaneously, with the forming 530. Additionally or alternatively, at least some portions of the shaping 540 may be performed subsequent to the forming 530. As discussed herein, the shaping 540 may include forming the oral-facing surface 104 as a single or contiguous surface, or the shaping may include forming the oral-facing surface 104 from a plurality of different surfaces defined by attached structures. For examples in which at least a portion of the shaping 540 is performed subsequent to the forming 530, the shaping may include at least one of subtractive manufacturing, machining, milling, and/or engraving the veneer body 102 to form the oral-facing surface 104.

As discussed herein, the shaping 540 may include shaping the oral-facing surface 104 to selectively support the customized temporary veneer 100 relative to the target region 400 solely by engagement with the one or more vestibular surfaces 304, without engaging a lingual surface 308 of any teeth 302 within target region 400, to be non-contacting with a lingual surface 308, and/or to be non-contacting with an occlusal surface 309 of any teeth 302 within target region 400. Additionally or alternatively, the shaping 540 may include shaping the oral-facing surface 104 to contact less than a threshold area percentage of any lingual surface 308, such as less than 25%, 20%, 10%, 5%, 2%, and/or 1%.

The shaping 540 may include shaping the oral-facing surface 104 to engage one or more buccal surfaces 306 and/or labial surfaces 307 of one or more teeth 302 within target region 400. The shaping 540 may include shaping oral-facing surface 104 to engage one or more teeth 302 adjacent to target region 400 or teeth 302 that are not directly obscured by customized temporary veneer 100. The shaping 540 may be performed based in part upon the analyzing 520. For example, the shaping 540 may include shaping the oral-facing surface 104 to closely follow the vestibular profile of the target region 400.

The shaping 540 may include forming the plurality of engaging surfaces in the oral-facing surface 104, as discussed herein, and this may be performed based on the analyzing 520. For example, the shaping 540 may include forming one or more distal-engaging surfaces 110, one or more mesial-engaging surfaces 112, and/or at least one pair of distal-engaging surfaces 110, such as discussed herein. As another example, the shaping 540 may include forming one or more incisal ledges 118 in the oral-facing surface 104 that are configured to engage one or more respective incisal edges 310, such as discussed herein. The shaping 540 further may include forming one or more space-filling protrusions in oral-facing surface 104 and disposing one or more corresponding engaging surfaces on each space-filling protrusion, which may be based on the analyzing 520. As examples, the shaping 540 may include forming in oral-facing surface 104, one or more gap-filling protrusions 116, which are configured to fill one or more gaps 320 in target region 400. The shaping 540 optionally may include forming one or more mesial-engaging surfaces 112 and/or distal-engaging surfaces 110 on each gap-filling protrusion 116, such as discussed herein. The shaping 540 also may include forming one or more embrasure-filling protrusions 114 in oral-facing surface 104 and optionally forming one or more mesial-engaging surfaces 112 and/or distal-engaging surfaces 110 on each embrasure-filling protrusion 114, such as discussed herein. The shaping 540 may include shaping the oral-facing surface 104 to engage or hook around one or more dental undercuts 328 in target region 400.

In some examples, the shaping 540 may include shaping the oral-facing surface 104 to define an interior arch span 122 that is nominally less than a corresponding dental arch span 360 of target region 400. In such examples, the forming 530 includes forming the veneer body 102 from a resilient material that permits selective expansion of the interior arch span 122 of oral-facing surface 104 such that oral-facing surface 104 may form a resilient snap-fit with target region 400, such as discussed herein.

For examples in which methods 500 include the preparing 515, the shaping 540 may include shaping the oral-facing surface 104 to selectively engage, and selectively release, the one or more retention structures installed on one or more teeth 302 in the target region, such as discussed herein. In other words, the shaping 540 may include forming one or more retention structure-engaging surfaces 120 in oral-facing surface 104 corresponding to the one or more additive retention structures 330 and/or subtractive retention structures, such as discussed herein.

For examples in which methods 500 include providing a plurality of customized temporary veneers 100, the shaping 540 may include shaping the oral-facing surface 104 of each customized temporary veneer 100 in a similar, or at least substantially similar, manner. This way, the customer 10 may try on the plurality of customized temporary veneers 100 that each include a similar fit, or are supported by the oral-facing surface 104 in a similar, or at least substantially similar, position within their mouth. Alternatively, the shaping 540 may include shaping the oral-facing surface 104 of two or more customized temporary veneers 100 to be different from one another, such that the customer 10 may try on different veneer fits and/or such as to accommodate different selections and/or arrangements of individual tooth veneers 202.

With continued reference to FIG. 8, methods 500 may include receiving 545 feedback from the customer regarding the customized temporary veneer. The receiving 545 may be responsive to the customer wearing and/or having worn the customized temporary veneer 100. The receiving 545 may include receiving feedback regarding the plurality of customized temporary veneers 100 for examples in which methods 500 include providing the plurality of customized temporary veneers 100. The feedback received from the customer 10 may include preferences and/or dislikes relating to the outward appearance of the customized temporary veneer 100, the fit of the customized temporary veneer 100, and/or features lacking in the customized temporary veneer 100.

As more specific examples, the receiving 545 may include receiving, from the customer 10, one or more desired oral features selected from the plurality of oral features 200 presented by the customized temporary veneer 100. For example, these desired oral features may include a preferred shape, size, color, etc. of individual tooth veneers 202. The receiving 545 also may include receiving, from the customer 10, one or more undesired oral features selected from the plurality of oral features 200 presented by the customized temporary veneer 100. For example, these undesired features may include a shape, size, color, etc. of individual tooth veneers 202 that the customer 10 does not like. As more examples, the desired oral features may include a preferred arrangement or selection of individual tooth veneers 202, and the undesired oral features may include an undesired selection or arrangement of individual tooth veneers 202. The receiving 545 further may include receiving feedback regarding a conformation of the customized temporary veneer 100, and this may include one or more preferred or disliked aspects regarding a fit of the oral-facing surface 104, a thickness 108 of the veneer body 102, a position in which the customized temporary veneer 100 is supported in their mouth, and/or the teeth 302 or region of natural gum 332 in target region 400 that is obscured by customized temporary veneer 100.

For examples in which methods 500 include providing a plurality of customized temporary veneers 100, the receiving 545 may include receiving feedback regarding two or more customized temporary veneers 100, which may include similar feedback to that discussed for the single customized temporary veneer 100. For example, the receiving 545 may include receiving a plurality of desired oral features and/or a plurality of undesired oral features selected from among the plurality of customized temporary veneers 100. As another example, the receiving 545 feedback may include receiving a preferred customized temporary veneer 100 and/or an undesired customized temporary veneer 100 selected from among the plurality of customized temporary veneers 100.

The receiving 545 may be performed with any suitable sequence or timing within methods 500, such as subsequent to the creating 525, prior to the producing 550, prior to the creating 555, and/or prior to the installing 560.

In some examples, methods 500 include producing 550 a modified customized temporary veneer 100. The producing 550 may include producing the modified customized temporary veneer 100 based on the feedback received at 545. For example, the producing 550 may include repeating the creating 525 to produce a new customized temporary veneer 100 that is different from the customized temporary veneer 100 initially produced by the creating 525. Additionally or alternatively, the producing 550 may include altering the customized temporary veneer 100.

In either example, the modified customized temporary veneer 100 may include the one or more desired oral features received at 545, may be free from the one or more undesired oral features received at 545, and/or comprises a modified veneer body 102 that is modified based on the feedback received regarding the conformation of the customized temporary veneer 100 initially produced by the creating 525. In some examples, the producing 550 includes providing the customer 10 with one or more auxiliary features, such as a portion of kit 250, that may be utilized to modify customized temporary veneer 100, as discussed herein. The producing 550 also may include producing a modified customized temporary veneer that is configured to be worn over prepared teeth, such as for examples in which methods 500 include performing the preparing 515 subsequent to the creating 525. When included in methods 500, the producing 550 may be performed subsequent or responsive to the receiving 545 and/or prior to the creating 555.

With continued reference to FIG. 8, methods 500 may include creating 555 a permanent veneer design. The creating 555 is performed responsive to the receiving 545 or based on the feedback received at 545. The creating 555 may be performed by the dental practitioner or at least in part at the direction of the dental practitioner. As referred to herein, the permanent veneer design is a design for a permanent veneer assembly that is to be installed in the customer's mouth 300. The creating 555 may include creating the permanent veneer design based on the desired outward appearance presented by the customized temporary veneer 100. The permanent veneer design may include a permanent veneer outward appearance, and the permanent veneer corresponding to the permanent veneer design is configured to present the permanent veneer outward appearance in replacement of the natural appearance of target region 400 when the permanent veneer is installed in the customer's mouth 300.

As more specific examples, the creating 555 may include creating the permanent veneer design with a permanent veneer outward appearance that includes the one or more desired oral features received at 545 and/or that is free from the one or more undesired oral features received at 545. Examples of undesired oral features and desired oral features are discussed herein in connection to the receiving 545. For examples in which methods 500 include providing a plurality of customized temporary veneers 100, the creating 555 may include creating the permanent veneer design based on the preferred customized temporary veneer and/or to include at least one oral feature 200 of the respective plurality of oral features 200 presented by the preferred customized temporary veneer. When included in methods 500, the creating 555 may be performed subsequent to the receiving 545 and/or prior to the installing 560.

Methods 500 also may include installing 560 a permanent veneer in the customer's mouth 300. More specifically, the installing 560 includes installing a permanent veneer that includes the permanent veneer design created at 555. In other words, the installing 560 includes installing a permanent veneer having a permanent veneer design that is selected based on the customized temporary veneer(s) 100 created at 525 and upon the customer's feedback regarding the customized temporary veneer(s) received at 545.

The installing 560 may be performed by the dental practitioner. The installing 560 may include permanently installing the permanent veneer in the target region 400 of the customer's mouth 400, which may include adhering and/or affixing a plurality of permanent tooth veneers to the customer's existing teeth 302 within the target region 400. In some examples, the installing 560 includes preparing a selection of the customer's teeth 302 within the target region 400 for the permanent veneer, which may include removing material from the customer's teeth 302, forming grooves in the customer's teeth, and/or applying an adhesive to the customer's teeth 302. The installing 560 further may include forming the plurality of permanent tooth veneers, such as to have the selected shape, size, texture, tint, etc. similar to, or at least substantially similar to, the customized temporary veneer produced at 550 regarding the individual tooth veneers 202 of the customized temporary veneer(s) 100.

FIG. 9 provides a flowchart schematically representing examples of methods 600 of utilizing a customized temporary veneer, according to the present disclosure. Methods 600 also may include methods of utilizing a plurality of customized temporary veneers 100. Methods 600 include selecting at 605, by a customer, a plurality of oral features to be presented by the customized temporary veneer(s), receiving at 610, by the customer, the customized temporary veneer(s), and selectively wearing at 615, by the customer, the customized temporary veneer. Methods 600 may include providing at 620, by the customer, feedback regarding the customized temporary veneer(s), and/or receiving at 625, by the customer, a permanent veneer that is designed based on the feedback.

The selecting 605 may include selecting any of the oral features 200 discussed herein. The selecting 605 may include viewing, by the customer, a representation of a target region of their mouth with a proposed customized temporary veneer 100 positioned within the target region. The representation may include an image, a photo, and/or a digital representation. This representation may be referred to as a proposed veneer-modified representation of target region 400. The proposed veneer modified representation may display, indicate, and/or provide for selection of the plurality of oral features, optionally along with other oral features that the customer does not select during the selecting 605. The selecting 605 also may include viewing, by the customer, a plurality of proposed veneer-modified representations, each displaying a respective set of oral features, and selecting the plurality of oral features from across the plurality of proposed veneer-modified representations and/or based on a preferred or favorite proposed veneer-modified representation. For examples in which methods 600 include utilizing a plurality of customized temporary veneers 100, the selecting 605 may include selecting a respective plurality of oral features to be presented by each customized temporary veneer 100, which may include selecting a plurality of preferred veneer modified representations.

Methods 600 further include receiving 610, by the customer, the customized temporary veneer. As discussed herein, the customized temporary veneer 100 is configured to be worn within the target region 400 of the customer's mouth 300 and to present the plurality of oral features in the vestibular direction of the target region 400. The plurality of oral features 200 presented by the customized temporary veneer 100 are the plurality of oral features 200 the customer selects during the selecting 605. In other words, the receiving 610 is preformed responsive to, or subsequent to, the selecting 605. The receiving 610 may include receiving the customized temporary veneer 100 from a dental practitioner or from a third party manufacturer. For examples in which methods 600 include utilizing a plurality of customized temporary veneers 100, the receiving 610 includes receiving the plurality of customized temporary veneers 100, with each customized temporary veneer 100 configured to present the respective plurality of oral features. As discussed herein, the respective plurality of oral features presented by each customized temporary veneer 100 is different from that presented by at least one other customized temporary veneer 100. In such examples, the receiving 610 includes receiving the kit 250 of customized temporary veneers 100. In some examples, the receiving 610 includes receiving one or more auxiliary features that are utilized to modify and/or install the customized temporary veneer 100, as discussed herein. For example, the receiving 610 may include receiving one or more additive retention features 330 and optionally adhesive for attaching the additive retention features to teeth 302.

In some examples, the receiving 615 includes receiving a modified customized temporary veneer. The modified customized temporary veneer may be modified based on the feedback provided by the customer at 620. Additionally or alternatively, the modified customized temporary veneer may be modified to engage prepared teeth.

Methods 600 also include selectively wearing 615 the customized temporary veneer by engaging an oral-facing surface of the customized temporary veneer with one or more vestibular surfaces within the target region. In other words, the selectively wearing 615 includes selectively installing, by the customer, the customized temporary veneer 100 received at 610 in their mouth 300. The selectively wearing 615 also may include selectively and repeatedly installing and removing the customized temporary veneer 100 within the target region 400 without damage to or destruction of the customized temporary veneer.

For examples in which methods 600 include utilizing a plurality of customized temporary veneers, the selectively wearing 615 includes selectively wearing two or more, and optionally each, of the customized temporary veneers 100. As a more specific example, the selectively wearing 615 may include selectively wearing a first customized temporary veneer 100, selectively removing the first customized temporary veneer 100, and selectively wearing a second customized temporary veneer 100. In other words, the selectively wearing may include interchanging the first customized temporary veneer for the second customized temporary veneer, such as to try on two different outward appearances presented by the first and second customized temporary veneers 100. In some examples, methods 600 include receiving 610, by the customer, a plurality of customized temporary veneers 100 and selectively wearing 615 only one of the plurality of customized temporary veneers 100.

The selectively wearing 615 may include selectively wearing the customized temporary veneer 100 on unprepared teeth and/or on prepared teeth, as discussed herein. In some examples, the selectively wearing 615 includes the customer 10 initially wearing customized temporary veneer 100 on unprepared teeth, subsequently deciding to have their teeth prepared (such as discussed herein with reference to methods 500), and wearing the customized temporary veneer 100 on the prepared teeth. In some examples, methods 600 initially include wearing one or more customized temporary veneers, deciding to have teeth prepared, subsequently receiving 610 a modified customized temporary veneer that is configured to engage the prepared teeth, and subsequently wearing the modified customized temporary veneer on the prepared teeth. In some examples, the selectively wearing 615 includes installing, by the customer 10, the one or more additive retention features received at 610 on their teeth. In such examples, the selectively wearing also may include the customer preparing their own teeth.

Methods 600 further may include providing 620, by the customer, feedback regarding the customized temporary veneer 100. The providing 620 may be responsive to, or be performed subsequent to, the selectively wearing 615. The providing 620 also may include providing the feedback to the party from whom the customized temporary veneer(s) were received, such as the dental practitioner or third party manufacturer. The providing 620 may include selecting one or more desired oral features and/or one or more undesired oral features from among the oral features 200 presented by the customized temporary veneer 100. For examples in which methods 600 include utilizing a plurality of customized temporary veneers, the providing 620 may include selecting the desired oral features and/or undesired oral features from among the respective pluralities of oral features presented by the plurality of customized temporary veneers. Additionally or alternatively, the providing 620 may include selecting a preferred customized temporary veneer from among the plurality of customized temporary veneers and/or selecting an undesired customized temporary veneer from the plurality of temporary veneers, as discussed herein.

In some examples, the providing 620 feedback includes requesting a permanent veneer design. This permanent veneer design may include the plurality of desired oral features, may not include the plurality of oral features, may be based on the preferred customized temporary veneer, and/or may not include the respective plurality of oral features presented by the undesired customized temporary veneer.

Methods 600 also may include receiving 625, by the customer, a permanent veneer that includes the permanent veneer design. In other words, the receiving 625 includes receiving a permanent veneer that includes desired oral features selected from those presented by the customized temporary veneer(s) selectively worn at 615. The receiving 625 additionally or alternatively may be referred to as having a permanent veneer installed.

Examples of inventive subject matter according to the present disclosure are presented in the following enumerated paragraphs. It is within the scope of the present disclosure that an individual step of a method recited herein, including in the following enumerated paragraphs, additionally or alternatively may be referred to as a "step for" performing the recited action.

A. A method of providing a customized temporary veneer, the method comprising:

obtaining a representation of a target region of a customer's mouth;

selecting a plurality of oral features to be presented by the customized temporary veneer;

creating the customized temporary veneer, wherein the creating comprises:

forming a veneer body of the customized temporary veneer, wherein the veneer body is configured to extend across at least a portion of the target region of the customer's mouth;

providing the plurality of oral features to an outward-facing surface of the veneer body, wherein the plurality of oral features collectively are configured to present a desired outward appearance in a vestibular direction of the target region of the customer's mouth; and based upon the representation of the target region of the customer's mouth, shaping an oral-facing surface of the veneer body to selectively engage one or more vestibular surfaces within the target region of the customer's mouth and to selectively support the customized temporary veneer relative to the target region by engagement with the one or more vestibular surfaces.

A1. The method of paragraph A, wherein the shaping comprises shaping the oral-facing surface of the veneer body to selectively support the customized temporary veneer relative to the target region solely by engagement with the one or more vestibular surfaces.

A2. The method of any of paragraphs A-A1, wherein the one or more vestibular surfaces are comprised in one or more teeth in the target region of the customer's mouth.

A3. The method of any of paragraphs A-A2, wherein the shaping comprises shaping the oral-facing surface of the veneer body to selectively support the customized temporary veneer relative to the target region without engaging a lingual surface of any teeth within the customer's mouth.

A4. The method of any of paragraphs A-A3, wherein the shaping comprises shaping the oral-facing surface to contact less than 20% of an area of a lingual surface of any teeth within the customer's mouth.

A5. The method of any of paragraphs A-A4, wherein the shaping comprises shaping the oral-facing surface to be non-contacting with an occlusal surface of any teeth within the customer's mouth.

A6. The method of any of paragraphs A-A5, wherein the obtaining comprises at least one of:

obtaining a mold of the target region of the customer's mouth;

obtaining one or more images of the target region of the customer's mouth;

obtaining a digital scan of the target region of the customer's mouth;

scanning the target region of the customer's mouth;

taking a dental impression of the target region of the customer's mouth; and taking one or more images of the target region of the customer's mouth.

A7. The method of any of paragraphs A-A6, wherein the obtaining is performed by a dental practitioner and/or in the presence of the customer.

A8. The method of any of paragraphs A-A7, wherein the obtaining comprises a/the dental practitioner preparing the representation of the target region of the customer's mouth from a/the one or more images of the target region provided by the customer and/or from a dental impression provided by the customer.

A9. The method of any of paragraphs A-A8, wherein the target region comprises a plurality of maxillary teeth within a maxillary dental arch of the customer's mouth.

A10. The method of paragraph A9, wherein the target region comprises a maxillary gum adjacent to the plurality of maxillary teeth.

A11. The method of any of paragraphs A-A8, wherein the target region comprises a plurality of mandibular teeth within a mandibular dental arch of the customer's mouth.

A12. The method of paragraph A11, wherein the target region comprises a mandibular gum adjacent to the plurality of mandibular teeth.

A13. The method of any of paragraphs A-A12, wherein at least the portion of the target region comprises at least one of:

one or more misaligned teeth;

one or more damaged teeth;

one or more gaps corresponding to one or more missing teeth; and a surgical site.

A14. The method of any of paragraphs A-A13, wherein the shaping comprises shaping the oral-facing surface to engage one or more buccal and/or labial surfaces of one or more teeth within the target region of the customer's mouth.

A15. The method of any of paragraphs A-A13, wherein the shaping comprises shaping the oral-facing surface to engage one or more incisal edges of one or more incisors within the target region of the customer's mouth.

A16. The method of any of paragraphs A-A15, further comprising analyzing the representation of the target region of the customer's mouth.

A17. The method of paragraph A16, wherein the analyzing comprises determining a vestibular profile of the target region of the customer's mouth, and wherein the shaping comprises shaping the oral-facing surface to closely match the vestibular profile of the target region.

A18. The method of any of paragraphs A-A17, wherein a/the analyzing comprises identifying one or more gingival embrasures within the target region of the customer's mouth, and wherein the shaping comprises shaping the oral-facing surface to extend within the one or more gingival embrasures, and optionally to engage portions of the customer's teeth that face the one or more gingival embrasures.

A19. The method of any of paragraphs A-A17, wherein a/the analyzing comprises identifying one or more dental undercuts in the representation of the target region of the customer's mouth, and wherein the shaping comprises shaping the oral-facing surface to selectively engage the one or more dental undercuts.

A20. The method of any of paragraphs A-A19, wherein a/the analyzing comprises determining a dental arch span of the target region of the customer's mouth, wherein the forming comprises forming the veneer body from a resilient material, wherein the oral-facing surface of the veneer body defines an interior arch span that corresponds to the dental arch span of the target region, and wherein the shaping comprises shaping the oral-facing surface of the veneer body such that the interior arch span thereof is nominally less than the dental arch span of the target region.

A21. The method of any of paragraphs A-A20, further comprising installing one or more retention structures on one or more teeth within the target region of the customer's mouth.

A22. The method of paragraph A21, wherein the shaping comprises shaping the oral-facing surface to selectively engage the one or more retention structures installed on the one or more teeth within the target region.

A23. The method of any of paragraphs A-A22, wherein the shaping is performed at least substantially simultaneously with the forming the veneer body.

A24. The method of paragraph A23, wherein the forming the veneer body comprises at least one of molding, casting, and additively manufacturing the veneer body.

A25. The method of any of paragraphs A-A24, wherein the shaping is performed subsequent to the forming the veneer body, and wherein the shaping comprises at least one of subtractive manufacturing, machining, milling, and/or engraving the veneer body to form the oral-facing surface.

A26. The method of any of paragraphs A-A25, further comprising receiving feedback from the customer about the customized temporary veneer, wherein the receiving feedback comprises at least one of:

receiving, from the customer, one or more desired oral features selected from the plurality of oral features presented by the customized temporary veneer;

receiving, from the customer, one or more undesired oral features selected from the plurality of oral features presented by the customized temporary veneer;

receiving feedback regarding a conformation of the customized temporary veneer.

A27. The method of paragraph A26, wherein the receiving feedback is responsive to the customer wearing the customized temporary veneer.

A28. The method of paragraph A27, further comprising producing a modified temporary veneer based on the feedback, wherein the producing the modified temporary veneer comprises:

creating a new customized temporary veneer based on the feedback; and altering the customized temporary veneer based on the feedback.

A29. The method of paragraph A28, wherein the modified temporary veneer at least one of:

comprises the one or more desired oral features;

is free from the one or more undesired oral features; and comprises a modified veneer body that is modified based on the feedback received on the conformation of the customized temporary veneer.

A30. The method of any of paragraphs A26-A29, further comprising creating a permanent veneer design based on the feedback, wherein the permanent veneer design comprises a permanent veneer outward appearance, and wherein the permanent veneer outward appearance at least one of:

comprises the one or more desired oral features; and is free from the one or more undesired oral features.

A31. The method of paragraph A30, further comprising installing a permanent veneer in the customer's mouth that comprises the permanent veneer design.

A32. The method of paragraph A31, wherein the installing the permanent veneer comprises preparing a/the customer's teeth within the target region for the permanent veneer.

A33. The method of any of paragraphs A31-A32, wherein the installing the permanent veneer comprises adhering the permanent veneer to a/the customer's teeth with a permanent adhesive.

A34. The method of any of paragraphs A-A33, wherein the plurality of oral features comprises a plurality of individual veneers, and wherein the providing the plurality of oral features comprises providing the plurality of individual veneers to the customized temporary veneer.

A35. The method of paragraph A34, wherein the plurality of oral features comprises a selected veneer color of the plurality of individual veneers, and wherein the providing the plurality of oral features includes applying the selected veneer color to the plurality of individual veneers.

A36. The method of any of paragraphs A34-A35, wherein the plurality of oral features comprises a selected veneer texture of the plurality of individual veneers, and wherein the providing the plurality of oral features comprises applying the selected veneer texture to the plurality of individual veneers.

A37. The method of any of paragraphs A-A36, wherein the plurality of oral features includes a custom gum structure, and wherein the providing the plurality of oral features comprises providing the custom gum structure to the customized temporary veneer.

A38. The method of paragraph A37, wherein the plurality of oral features comprises a selected gum color of the custom gum structure, and wherein the providing the plurality of oral features comprises applying the selected gum color to the custom gum structure.

A39. The method of any of paragraphs A37-A38, wherein the plurality of oral features includes a selected gum texture of the custom gum structure, and wherein the providing the plurality of oral features comprises providing the selected gum texture to the custom gum structure.

B. A method of providing a plurality of customized temporary veneers, the method comprising:

obtaining a representation of a target region of a customer's mouth;

selecting a respective plurality of oral features to be presented by each customized temporary veneer of the plurality of customized temporary veneers;

creating the plurality of customized temporary veneers, wherein the creating comprises:

forming a veneer body of each customized temporary veneer of the plurality of customized temporary veneers, wherein the veneer body is configured to extend across at least a portion of the target region of the customer's mouth;

based upon the representation of the target region of the customer's mouth, shaping an oral-facing surface of the veneer body to engage one or more vestibular surfaces within the target region of the customer's mouth and to selectively support the customized temporary veneer relative to the target region by engagement with the one or more vestibular surfaces; and providing a respective plurality of oral features to an outward-facing surface of the veneer body, wherein the respective plurality of oral features collectively are configured to present a respective oral appearance in a vestibular direction of the target region of the customer's mouth, and wherein the respective plurality of oral features provided to each customized temporary veneer of the plurality of customized temporary veneers is different from the respective plurality of oral features provided to at least one other customized temporary veneer of the plurality of customized temporary veneers.

B1. The method of paragraph B, further comprising receiving feedback from the customer regarding the plurality of customized temporary veneers, wherein the receiving feedback comprises receiving a preferred customized temporary veneer selected from the plurality of customized temporary veneers.

B2. The method of paragraph B1, further comprising creating a permanent veneer design based on the preferred customized temporary veneer of the plurality of customized temporary veneers, wherein the permanent veneer design comprises a permanent veneer outward appearance, and wherein the permanent veneer outward appearance comprises at least one oral feature of the respective plurality of oral features presented by the preferred customized temporary veneer.

B3. The method of paragraph B, wherein the plurality of customized temporary veneers form a/the kit of the plurality customized temporary veneers of any of paragraphs D-D3.

B4. The method of any of paragraphs B-B3, further comprising performing the steps of any of paragraphs A-A39 on at least one customized temporary veneer of the plurality of customized temporary veneers.

C. A customized temporary veneer configured to be temporarily installed in a customer's mouth to provide a desired oral appearance to the customer's mouth, the customized temporary veneer comprising:

a veneer body configured to extend across at least a portion of a target region of the customer's mouth, wherein the veneer body comprises an oral-facing surface and an outward-facing surface opposed to the oral-facing surface, wherein the oral-facing surface is configured to selectively engage one or more vestibular surfaces within the target region of the customer's mouth and to selectively support the customized temporary veneer relative to the target region by engagement with the one or more vestibular surfaces; and a plurality of oral features defining at least a portion of the outward-facing surface of the veneer body, wherein the plurality of oral features collectively are configured to present the desired oral appearance in a vestibular direction from the target region when the customized temporary veneer is installed in the customer's mouth.

C1. The customized temporary veneer of paragraph C, wherein the customized temporary veneer is configured to be selectively and repeatedly engaged with and disengaged from the one or more vestibular surfaces without damage or destruction to the customized temporary veneer.

C2. The customized temporary veneer of any of paragraphs C-C1, wherein the veneer body is configured to resiliently bias the oral-facing surface into engagement with the one or more vestibular surfaces when the customized temporary veneer is installed in the customer's mouth.

C3. The customized temporary veneer of any of paragraphs C-C2, wherein substantially the entirety of the customized temporary veneer extends within a vestibule of the customer's mouth when the customized temporary veneer is installed within the customer's mouth.

C4. The customized temporary veneer of any of paragraphs C-C3, wherein the oral-facing surface of the veneer body is configured to selectively support the customized temporary veneer relative to the target region solely by engagement with the one or more vestibular surfaces.

C5. The customized temporary veneer of any of paragraphs C-C4, wherein the oral-facing surface of the veneer body is configured to selectively support the customized temporary veneer relative to the target region without engaging a lingual surface of any teeth within the target region of the customer's mouth.

C6. The customized temporary veneer of any of paragraphs C-C5, formed according to the method of any of paragraphs A-A39.

D. A kit, comprising a plurality of customized temporary veneers, wherein each customized temporary veneer of the plurality of customized temporary veneers comprises:

a veneer body configured to extend across at least a portion of the customer's mouth, wherein the veneer body comprises an oral-facing surface and an outward-facing surface opposed to the oral-facing surface, wherein the oral-facing surface is configured to selectively engage one or more vestibular surfaces within a target region of the customer's mouth and to selectively support the customized temporary veneer relative to the target region by engagement with the one or more vestibular surfaces; and a respective plurality of oral features defining at least a portion of the outward-facing surface of the veneer body, wherein the plurality of oral features collectively are configured to present a respective oral appearance in a vestibular direction from the target region when the customized temporary veneer is installed in the customer's mouth, and wherein the respective plurality of oral features comprised in each customized temporary veneer of the plurality of customized temporary veneers is different from the respective plurality of oral features included in at least one other customized temporary veneer of the plurality of customized temporary veneers.

D1. The kit of paragraph D, wherein the kit provides a plurality of oral appearances for the customer to selectively try on by selectively wearing and selectively interchanging the plurality of customized temporary veneers, wherein the plurality of oral appearances comprises the respective oral appearance of each customized temporary veneer of the plurality of customized temporary veneers.

D2. The kit of any of paragraphs D-D1, wherein each customized temporary veneer of the plurality of customized temporary veneers further comprises the subject matter of any of paragraphs C1-C6.

D3. The kit of any of paragraphs D-D2, formed according to the methods of any of paragraphs B-B4.

E. A method of utilizing a customized temporary veneer, the method comprising:

selecting, by a customer, a plurality of oral features to be presented by the customized temporary veneer;

receiving, by the customer, the customized temporary veneer, wherein the customized temporary veneer is configured to be worn within a target region of the customer's mouth and present the plurality of oral features in a vestibular direction of the target region of the customer's mouth; and selectively wearing, by the customer, the customized temporary veneer by engaging an oral-facing surface of the customized temporary veneer with one or more vestibular surfaces within the target region.

E1. The method of paragraph E, further comprising providing feedback, by the customer, wherein the providing feedback comprises one or more of:

selecting, by the customer, one or more desired oral features from the plurality of oral features;

selecting, by the customer, one or more undesired oral features from the plurality of oral features;

requesting, by the customer, a modified customized temporary veneer that includes the one or more desired oral features and/or that does not include the one or more undesired oral features;

selecting, by the customer, a permanent veneer design that includes the one or more desired oral features and/or that does not include the one or more undesired oral features.

E2. The method of paragraph E1, further comprising receiving, by the customer, a permanent veneer that comprises the permanent veneer design.

E3. The method of any of paragraphs E-E2, wherein the selectively wearing comprises selectively and repeatedly installing and removing the customized temporary veneer within the target region without damage to or destruction of the customized temporary veneer.

E4. The method of paragraph E3, wherein the method comprises utilizing a plurality of customized temporary veneers that comprise the customized temporary veneer;

wherein the selecting comprises selecting a respective plurality of oral features to be presented by each customized temporary veneer of the plurality of customized temporary veneers, wherein the receiving comprises receiving the plurality of customized temporary veneers, wherein each customized temporary veneer is configured to be worn within the customer's mouth and to present the respective plurality of oral features in the vestibular direction of the target region;

wherein the respective plurality of oral features comprised in each customized temporary veneer of the plurality of customized temporary veneers is different from the respective plurality of oral features included in at least one other customized temporary veneer of the plurality of customized temporary veneers; and wherein the selectively wearing comprises selectively wearing two or more customized temporary veneers of the plurality of customized temporary veneers.

E5. The method of paragraph E4, wherein the selectively wearing comprises selectively wearing a first customized temporary veneer of the plurality of customized temporary veneers, selectively removing the first customized temporary veneer of the plurality of customized temporary veneers, and selectively wearing a second customized temporary veneer of the plurality of customized temporary veneers.

E6. The method of any of paragraphs E-E5, wherein a/the providing feedback comprises at least one of:

selecting a plurality of desired oral features from among the respective pluralities of oral features presented by a/the plurality of customized temporary veneers;

selecting a plurality of undesired oral features from among the respective pluralities of oral features presented by the plurality of customized temporary veneers;

selecting a preferred customized temporary veneer from among the plurality of customized temporary veneers; and selecting an undesired customized temporary veneer from the plurality of customized temporary veneers.

E7. The method of paragraph E6, wherein the providing feedback further comprises requesting a permanent veneer design that at least one of:

comprises the plurality of desired oral features;

does not comprise the plurality of undesired oral features;

is based upon the preferred customized temporary veneer; and does not include at least some of the respective plurality of oral features presented by the undesired customized temporary veneer.

E8. The method of any of paragraphs E-E7, further comprising receiving a permanent veneer that comprises a/the permanent veneer design.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities, should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "At least one of A or B," or, equivalently, "at least one of A and/or B") may refer, in one embodiment to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure that was present originally.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

As used herein, the phrase "for example," the phrase "as an example," and/or simply the term "example," when used with reference to one or more components, features, details, structures, embodiments, and/or methods according to the present disclosure, are intended to convey that the described component, feature, detail, structure, embodiment, and/or method is an example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

INDUSTRIAL APPLICABILITY

The customized temporary veneers and methods disclosed herein are applicable to the dentistry, orthodontics, and cosmetic industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of providing a plurality of customized temporary veneers, the method comprising:

obtaining a representation of a target region of a customer's mouth;

selecting a plurality of oral features to be presented by the customized temporary veneer;

creating the customized temporary veneer, wherein the creating comprises:

forming a veneer body of the customized temporary veneer, wherein the veneer body is configured to extend across at least a portion of the target region of the customer's mouth;

providing the plurality of oral features to an outward-facing surface of the veneer body, wherein the plurality of oral features collectively are configured to present a desired outward appearance in a vestibular direction of the target region of the customer's mouth; and based upon the representation of the target region of the customer's mouth, shaping an oral-facing surface of the veneer body to selectively engage one or more vestibular surfaces within the target region of the customer's mouth and to selectively support the customized temporary veneer relative to the target region by engagement with the one or more vestibular surfaces;

wherein the shaping includes shaping the oral-facing surface of the veneer body to include one or more retention structure-engaging surfaces configured to engage and be anchored by a corresponding additive retention structure that projects from a corresponding vestibular surface within the target region of the customer's mouth;

repeating the selecting to select a respective plurality of oral features to be presented by each customized temporary veneer of the plurality of customized temporary veneers; and repeating the creating to create the plurality of customized temporary veneers;

wherein the respective plurality of oral features provided to each customized temporary veneer of the plurality of customized temporary veneers is different from the respective plurality of oral features provided to at least one other customized temporary veneer of the plurality of customized temporary veneers.

2. The method of claim 1, wherein the shaping comprises shaping the oral-facing surface of the veneer body to selectively support the customized temporary veneer relative to the target region solely by engagement with the one or more vestibular surfaces, wherein the one or more vestibular surfaces are defined by both the additive retention structure and one or more teeth within the target region of the customer's dental arch.

3. The method of claim 2, wherein the shaping includes shaping such that the veneer body fails to extend across any lingual surfaces of any teeth within the target region of the customer's mouth.

4. The method of claim 1, wherein the shaping comprises shaping the oral-facing surface to contact less than 30% of an area of a lingual surface of any tooth within the customer's mouth.

5. The method of claim 1, wherein the shaping comprises shaping the oral-facing surface to be non-contacting with an occlusal surface of any teeth within the customer's mouth.

6. The method of claim 1, further comprising analyzing the representation of the target region of the customer's mouth, wherein the analyzing comprises determining a vestibular profile of the target region of the customer's mouth, wherein the vestibular profile includes vestibular surfaces of at least one tooth within the target region and vestibular surfaces of a natural gum within the target region, and further wherein the shaping comprises shaping the oral-facing surface to closely match the vestibular profile of the target region such that the oral-facing surface is positioned at most 1 millimeter from vestibular surfaces within the target region of the customer's mouth.

7. The method of claim 1, further comprising analyzing the representation of the target region of the customer's mouth, wherein the analyzing comprises determining a dental arch span of the target region of the customer's mouth, wherein the dental arch span is measured transverse to a midline of the customer's mouth and between opposed vestibular surfaces of corresponding teeth positioned on either side of the midline, wherein the forming comprises forming the veneer body from a resilient material, wherein the oral-facing surface of the veneer body defines an interior arch span that corresponds to the dental arch span of the target region, and wherein the shaping comprises shaping the oral-facing surface of the veneer body such that the interior arch span thereof is less than the dental arch span of the target region.

8. The method of claim 1, further comprising receiving feedback from the customer about the customized temporary veneer, wherein the receiving feedback comprises at least one of:

receiving, from the customer, one or more desired oral features selected from the plurality of oral features presented by the customized temporary veneer;

receiving, from the customer, one or more undesired oral features selected from the plurality of oral features presented by the customized temporary veneer; and receiving, from the customer, feedback regarding a conformation of the customized temporary veneer.

9. The method of claim 8, wherein the receiving feedback is responsive to the customer wearing the customized temporary veneer.

10. The method of claim 8, further comprising creating a permanent veneer design based on the feedback, wherein the permanent veneer design comprises a permanent veneer outward appearance, and wherein the permanent veneer outward appearance at least one of:

comprises the one or more desired oral features; and is free from the one or more undesired oral features.

11. The method of claim 10, further comprising installing a permanent veneer in the customer's mouth, wherein the permanent veneer comprises the permanent veneer design.

12. The method of claim 1, wherein the plurality of oral features comprises a plurality of individual veneers, and wherein the providing the plurality of oral features comprises providing the plurality of individual veneers to the customized temporary veneer.

13. The method of claim 12, wherein the plurality of oral features further comprises at least one of a selected veneer texture of the plurality of individual veneers and a selected veneer color of the plurality of individual veneers, and wherein the providing the plurality of oral features includes applying the at least one of the selected veneer texture and the selected veneer color to the plurality of individual veneers.

14. The method of claim 1, wherein the plurality of oral features includes a custom gum structure, and wherein the providing the plurality of oral features comprises providing the custom gum structure to the customized temporary veneer.

15. The method of claim 14, wherein the plurality of oral features further includes at least one of a selected gum color of the custom gum structure and a selected gum texture of the custom gum structure, and wherein the providing the plurality of oral features further includes applying the at least one of the selected gum texture and the selected gum color to the custom gum structure.

16. The method of claim 1, further comprising receiving feedback from the customer on the plurality of customized temporary veneers, wherein the receiving feedback comprises receiving a preferred customized temporary veneer selected from the plurality of customized temporary veneers.

17. The method of claim 16, further comprising creating a permanent veneer design based on the preferred customized temporary veneer of the plurality of customized temporary veneers, wherein the permanent veneer design comprises a permanent veneer outward appearance, and wherein the permanent veneer outward appearance comprises at least one oral feature of the respective plurality of oral features presented by the preferred customized temporary veneer.

18. The method of claim 1, wherein the customized temporary veneer is configured to be selectively and repeatedly engaged with and disengaged from the one or more vestibular surfaces without damage or destruction to the customized temporary veneer or the one or more vestibular surfaces.

19. The method of claim 1, wherein the one or more retention structure-engaging surfaces are configured to engage and be anchored by the corresponding additive retention structure, and wherein the corresponding additive retention structure includes a protrusion that projects from the corresponding vestibular surface within the target region of the customer's mouth, and wherein the one or more retention structure-engaging surfaces include one or more of a slot, a groove, a recess, or a sleeve configured to selectively receive and engage the protrusion.

20. The method of claim 1, wherein the one or more retention structure-engaging surfaces are configured to engage and be anchored by the corresponding additive retention structure, and wherein the method further comprises forming the corresponding additive retention structure on the corresponding vestibular surface within the target region of the customer's mouth.

21. The method of claim 1, wherein the at least a portion of the target region of the customer's mouth includes a plurality of adjacent teeth within a single dental arch of the customer's mouth and excludes at least one tooth within the single dental arch.

22. The method of claim 3, wherein the shaping includes shaping such that the veneer body fails to extend across any occlusal surfaces of any teeth within the target region of the customer's mouth.

23. The method of claim 1, wherein the shaping the oral-facing surface of the veneer body includes shaping to directly and selectively engage one or more vestibular surfaces of one or more teeth within the target region of the customer's mouth and to selectively support the customized temporary veneer relative to the target region by direct engagement with the one or more vestibular surfaces of the one or more teeth.

\* \* \* \* \*